(12) United States Patent
Thomaszewski et al.

(10) Patent No.: US 9,892,539 B2
(45) Date of Patent: *Feb. 13, 2018

(54) FAST RIG-BASED PHYSICS SIMULATION

(71) Applicant: DISNEY ENTERPRISES, INC., Burbank, CA (US)

(72) Inventors: Bernhard Thomaszewski, Zurich (CH); Robert Sumner, Zurich (CH); Fabian Hahn, Zurich (CH); Stelian Coros, Zurich (CH); Markus Gross, Zurich (CH); Sebastian Martin, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 14/057,904

(22) Filed: Oct. 18, 2013

(65) Prior Publication Data

US 2014/0198107 A1 Jul. 17, 2014

Related U.S. Application Data

(63) Continuation-in-part of application No. 13/843,856, filed on Mar. 15, 2013, now Pat. No. 9,659,397.

(60) Provisional application No. 61/751,747, filed on Jan. 11, 2013.

(51) Int. Cl.
*G06T 13/40* (2011.01)
*G06T 13/00* (2011.01)
*G06T 13/20* (2011.01)

(52) U.S. Cl.
CPC ............. *G06T 13/40* (2013.01); *G06T 13/00* (2013.01); *G06T 13/20* (2013.01)

(58) Field of Classification Search
None
See application file for complete search history.

(56) References Cited

U.S. PATENT DOCUMENTS

| | | | |
|---|---|---|---|
| 6,195,625 B1 | 2/2001 | Day et al. | |
| 6,522,331 B1 | 2/2003 | Danks | |
| 7,403,202 B1* | 7/2008 | Nash | G06T 7/2033 345/474 |
| 8,054,313 B1 | 11/2011 | Baraff et al. | |
| 8,269,778 B1 | 9/2012 | Baraff et al. | |
| 8,599,197 B1 | 12/2013 | Yu et al. | |

(Continued)

OTHER PUBLICATIONS

McLaughlin, Tim, Larry Cutler, and David Coleman., "Character rigging, deformations, and simulations in film and game production." ACM SIGGRAPH 2011 Courses. ACM, 2011.*

(Continued)

*Primary Examiner* — Sarah Le
(74) *Attorney, Agent, or Firm* — Sheppard, Mullin, Richter & Hampton LLP

(57) ABSTRACT

A method is disclosed for applying physics-based simulation to an animator provided rig. The disclosure presents equations of motions for simulations performed in the subspace of deformations defined by an animator's rig. The method receives an input rig with a plurality of deformation parameters, and the dynamics of the character are simulated in the subspace of deformations described by the character's rig. Stiffness values defined on rig parameters are transformed to a non-homogeneous distribution of material parameters for the underlying rig.

18 Claims, 13 Drawing Sheets

(56) References Cited

U.S. PATENT DOCUMENTS

| | | | |
|---|---|---|---|
| 8,704,823 | B1 | 4/2014 | Waggoner et al. |
| 8,902,234 | B1 | 12/2014 | Sanocki et al. |
| 9,098,944 | B2 | 8/2015 | Witkin et al. |
| 2006/0106494 | A1 | 5/2006 | Alvarez et al. |
| 2006/0139347 | A1 | 6/2006 | Choi et al. |
| 2007/0092121 | A1* | 4/2007 | Periaswamy ......... G06T 7/0012 382/128 |
| 2008/0309664 | A1 | 12/2008 | Zhou et al. |
| 2009/0174703 | A1 | 7/2009 | Hermanson et al. |
| 2010/0134501 | A1 | 6/2010 | Lowe et al. |
| 2012/0281019 | A1 | 11/2012 | Tamstorf et al. |
| 2013/0120404 | A1 | 5/2013 | Mueller et al. |
| 2014/0035901 | A1 | 2/2014 | Chen et al. |

OTHER PUBLICATIONS

Capell, Steve, et al., "Physically based rigging for deformable characters." Proceedings of the 2005 ACM SIGGRAPH/Eurographics symposium on Computer animation. ACM, 2005.*

Kim, Junggon, and Nancy S. Pollard., "Fast simulation of skeleton-driven deformable body characters." ACM Transactions on Graphics (TOG) 30.5 (2011): 121.*

Meredith, Michael, and Steve Maddock., "Using a half-jacobian for real-time inverse kinematics." Proceedings of the International Conference on Computer Games: Artificial Intelligence, Design and Education. 2004.*

Ryan Grady, Aran Stubbs, Louis Ronat, "Rhythm and Hues #3: Solving Large Linear Systems by Algebraic Multigrid", Final Report. Field Session 2005, http://eecs.mines.edu/Courses/csci370/FS2005/R&H3.doc.*

Cyberbotics, "7.3 Tutorial 2: Modification of the Environment (20 minutes)", posted Dec. 10, 2011, Cyberbotics ltd, https://www.cyberbotics.com/guide/tutorial-2-modification-of-the-environment-20-minutes.php.*

Wei, Xiaolin, Jianyuan Min, and Jinxiang Chai. "Physically valid statistical models for human motion generation." ACM Transactions on Graphics (TOG) 30.3 (2011): 19.*

Blender "Setting", posted Apr. 10, 2009, https://www.blender.org/manual/physics/soft_body/settings.html.*

Baran, I., and Popovic, J., Automatic rigging and animation of 3D characters, Proc. of ACM SIGGRAPH '07, 2007.

Barbic, J., and James, D. L., Real-time subspace integration for st. venant-kirchhoff deformable models, Proc. of ACM SIGGRAPH '05, 2005, 982-990.

Barbic, J., and James, D. L., Subspace self-collision culling, ACM Trans. on Graphics (SIGGRAPH 2010), 2010, 81:1-81:9, 29, 3.

Barbic, J., and Zhao, Y., Real-time large-deformation substructuring, ACM Trans. on Graphics (SIGGRAPH 2011), 2011, 91:1-91:7, 30, 4.

Barr, A. H., Global and local deformations of solid primitives, Computer Graphics (Proceedings of SIGGRAPH 84), 1984, 21-30, vol. 18.

Capell, S., Green, S., Curless, B., Duchamp, T., and Popovic, Z., Interactive skeleton-driven dynamic deformations, Proc. of ACM SIGGRAPH '02, 2002, 586-593.

Coros, S., Beaudoin, P., and Van De Panne, M., Generalized biped walking control, ACM Transctions on Graphics, 2010, 29, 4, Article 130.

Dambreville, S., Rathi, Y., and Tannenbaum, A., Shapebased approach to robust image segmentation using kernel pca, Computer Vision and Pattern Recognition, 2006 IEEE Computer Society Conference on, 2006, 977-984, vol. 1.

Faloutsos, P., Van De Panne, M., and Terzopoulos, D., Dynamic free-form deformations for animation synthesis, IEEE Transactions on Visualization and Computer Graphics, 1997, 201-214, Jul. 3.

Gilles, B., Bousquet, G., Faure, F., and Pai, D., Frame-based elastic models, ACM Trans. on Graphics, 2011, 30, 2.

Hughes, T. J. R., The Finite Element Method. Linear Static and Dynamic Finite Element Analysis, 2000, Dover Publications.

Irving, G., Teran, J., and Fedkiw, R., Invertible finite elements for robust simulation of large deformation, Proc. of Symp. on Computer Animation (SCA '04), 2004, 131-140.

James, D. L., and Fatahalian, K., Precomputing interactive dynamic deformable scenes, in ACM SIGGRAPH 2003 Papers (SIGGRAPH '03), 2003, 879-887, ACM, New York, NY, USA.

Joshi, P., Meyer, M., Derose, T., Green, B., and Sanocki, T., Harmonic coordinates for character articulation, ACM SIGGRAPH 2007 papers (SIGGRAPH '07), 2007, ACM, New York, NY, USA.

Ju, T., Zhou, Q.-Y., Van De Panne, M., Cohen-Or, D., and Neumann, U., Reusable skinning templates using cage-based deformations, ACM Trans. Graph. Dec. 27, 2008, 122:1-122:10.

Kim, T., and James, D. L., Skipping steps in deformable simulation with online model reduction, ACM SIGGRAPH Asia 2009 papers (SIGGRAPH Asia '09), 2009, 123:1-123:9, ACM, New York, NY, USA.

Krausea, R., and Walloth, M., A time discretization scheme based on rothe's method for dynamical contact problems with friction, Computer Methods in Applied Mechanics and Engineering, 2009, 199, 1-4, 1-19.

Krysl, P., Lall, S., and Marsden, J. E., Dimensional model reduction in non-linear finite element dynamics of solids and structures, International Journal for Numerical Methods in Engineering, 2001, 479-504, 51, 4.

Levin, D. I. W., Litven, J., Jones, G. L., Sueda, S., and Pai, D. K., Eulerian solid simulation with contact, ACM Transactions on Graphics, 2011, 36:1-36:10, 30, Aug. 4.

Lewis, J. P., Cordner, M., and Fong, N., Pose space deformation: a unified approach to shape interpolation and skeleton-driven deformation, Proc. of ACM SIGGRAPH '00, 2000, 165-172.

Li, H., Weise, T., and Pauly, M., Example-based facial rigging, ACM Trans. Graph., 2010, 32:1-32:6, Jul. 29.

Magnenat-Thalmann, N., Laperriere, R., and Thalmann, D., Joint-dependent local deformations for hand animation and object grasping, Proceedings on Graphics interface '88, 1988, 26-33.

Martin, S., Thomaszewski, B., Grinspun, E., and Gross, M., Example-based elastic materials, ACM Trans. on Graphics (Proc. SIGGRAPH), 2011, 72:1-72:8, 30, 4.

McAdams, A., Zhu, Y., Selle, A., Empey, M., Tamstorf, R., Teran, J., and Sifakis, E., Efficient elasticity for character skinning with contact and collisions, Proc. of ACM SIGGRAPH '11, 2011, 37:1-37:12.

Nocedal, J., and Wright, S. J., Numerical Optimization, 2006, Springer, August.

Rohmer, D., Hahmann, S., and Cani, M.-P., Exact volume preserving skinning with shape control, Proc. of Symp. on Computer Animation '09, 2009, 83-92.

Savoye, Y., and Franco, J.-S., CagelK: dual-laplacian cage-based inverse kinematics, Proceedings of the 6th international conference on Articulated motion and deformable objects (AMDO'10), 2010, 280-289, Springer-Verlag, Berlin, Heidelberg.

Sederberg, T. W., and Parry, S. R., Free-form deformation of solid geometric models, Computer Graphics (Proceedings of ACM SIGGRAPH 86), 1986, 151-160, vol. 20.

Seol, Y., Seo, J., Kim, P. H., Lewis, J. P., and Noh, J., Artist friendly facial animation retargeting, ACM Trans. on Graphics (Proc. SIGGRAPH Asia '11), 2011.

Singh, K., and Fiume, E. L., Wires: A geometric deformation technique, Proceedings of ACM SIGGRAPH 1998, Computer Graphics Proceedings, Annual Conference Series, 1998, 405-414.

Sloan, P.-P. J., Rose, III, C. F., and Cohen, M. F., Shape by example, Proceedings of the 2001 symposium on Interactive 3D graphics, 2001, 135-143, ACM Press.

Frohlich, S., Botsch, M., Example-driven deformations based on discrete shells, Computer Graphics Forum, 2011, 2246-2257, 30.

Sumner, R. W., Zwicker, M., Gotsman, C., and Popovic, J., Mesh-based inverse kinematics, ACM Trans. Graph, 2005, 488-495, Jul. 24.

Whitaker, H., and Halas, J., Timing for Animation, 2002, Focal Press.

(56) References Cited

OTHER PUBLICATIONS

Hahn, F., Martin, S., Thomaszewski, B., Coros, S., Sumner, R., Gross, M., Rig-Space Physics, ACM Transactions on Graphics (TOG)—Proceedings of ACM SIGGRAPH 2012, 2012, 31, 4, 72.

* cited by examiner

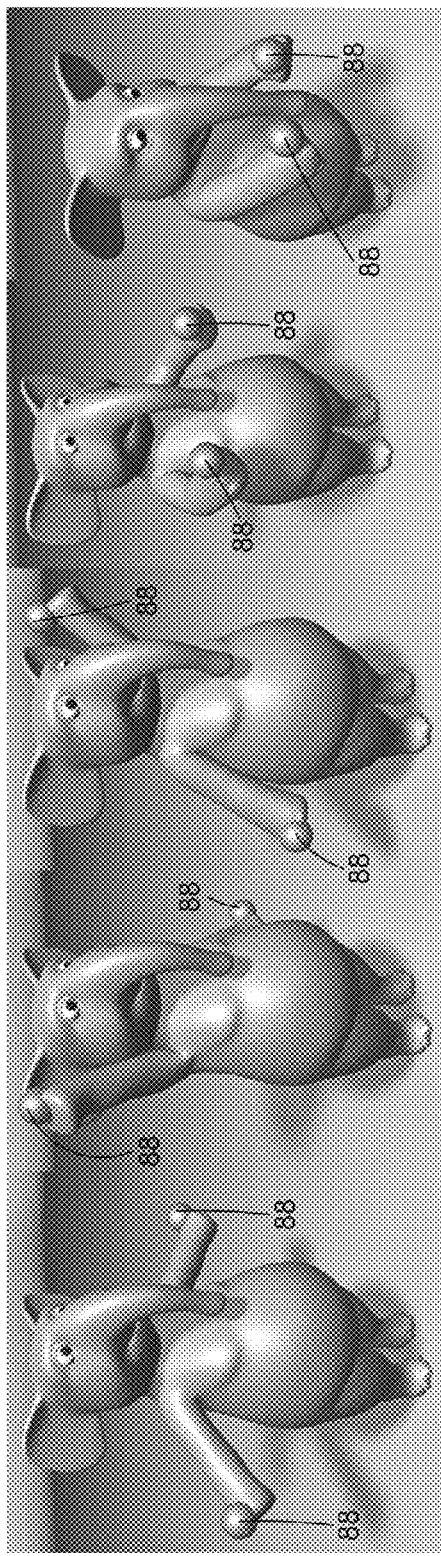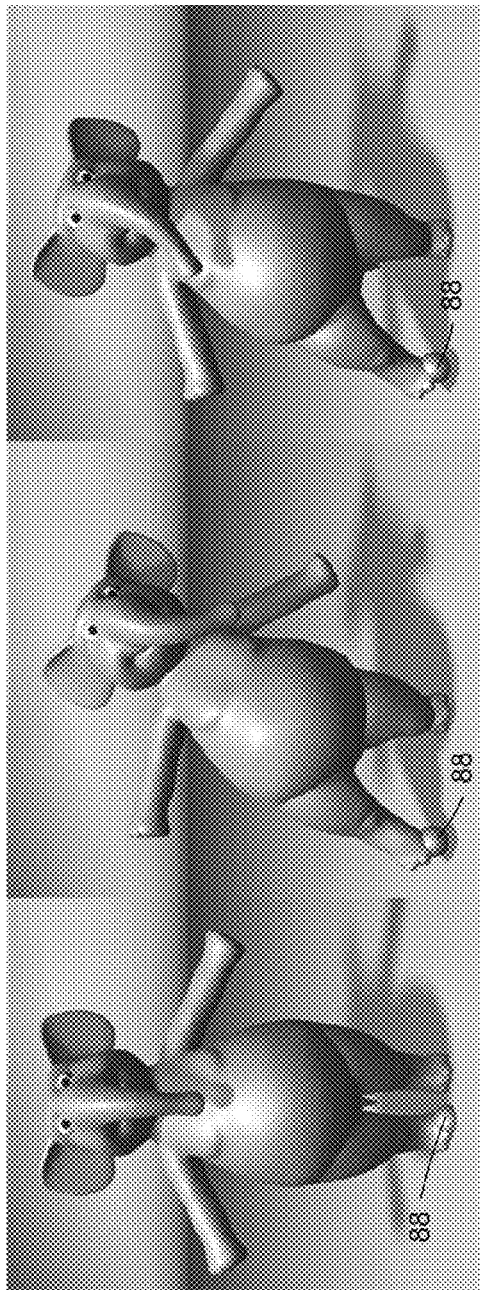
FIG. 8

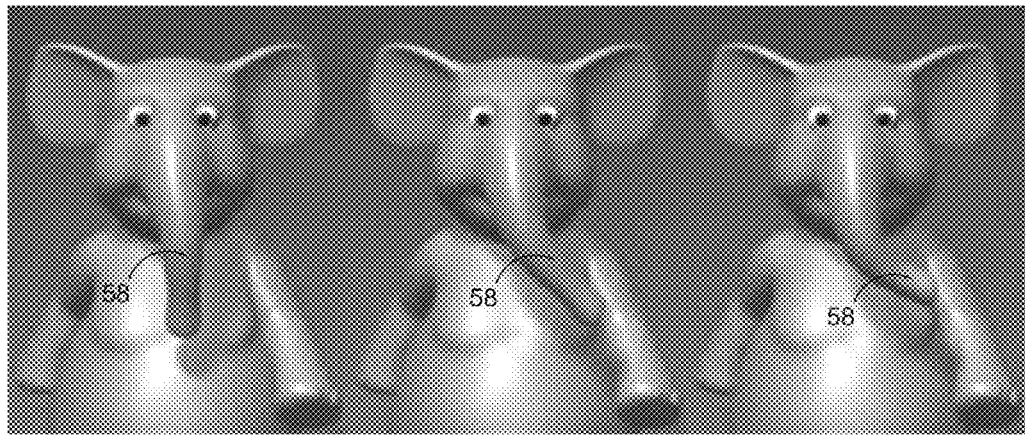

FIG. 11

Algorithm 1 Finding a sparse correspondence set for skinning
1: for all internal vertices $j$ do
2: $\quad(\mathbf{w}_j, r_0) = \text{solveNNLS}(j)$
3: $\quad r = r_0, \tilde{\mathbf{w}}^j = \mathbf{w}^j$
4: $\quad \tilde{\mathbf{w}}^j = \mathbf{w}^j$
5: $\quad$ while $r < \delta$ or $r/r_0 < 1.5$ do
6: $\quad\quad \mathbf{w}^j = \tilde{\mathbf{w}}^j$
7: $\quad\quad$ reduce system by pruning smallest dimension of $\mathbf{w}_j$
8: $\quad\quad (\tilde{\mathbf{w}}^j, r) = \text{solveL1}(j, \mathbf{w}^j)$
9: $\quad$ end while
10: $\quad (\mathbf{w}^j, r_f) = \text{solveNNLS}(j)$
11: end for

FIG. 12

| Solver | Trunk | | Belly | | Sumone | |
|---|---|---|---|---|---|---|
| | $t_{frame}$ | sp | $t_{frame}$ | sp | $t_{frame}$ | sp |
| RSP | 7.24 | ×1 | 46.5 | ×1 | — | — |
| IV1, JE1 | 0.37 | ×19 | 0.53 | ×86 | 2.82 | ×1.0 |
| IV1, JE2 | 0.39 | ×18 | 0.39 | ×118 | 2.48 | ×1.1 |
| IV2, JE1 | 0.12 | ×56 | 0.27 | ×168 | 1.04 | ×2.7 |
| IV2, JE2 | 0.13 | ×53 | 0.13 | ×348 | 0.58 | ×4.9 |

Table 1: *Timings for the elephant walk cycle (Trunk, Belly) and the Sumone animation on an Intel Core i7-930 4 x 2.8Ghz using per-frame (JE1) and deferred (JE2) Jacobian evaluation, as well as static solves (IV1) and skinning (IV2) for the internal vertices. $t_{frame}$ is computation time per frame in sec., and sp is the speedup.*

FIG. 13

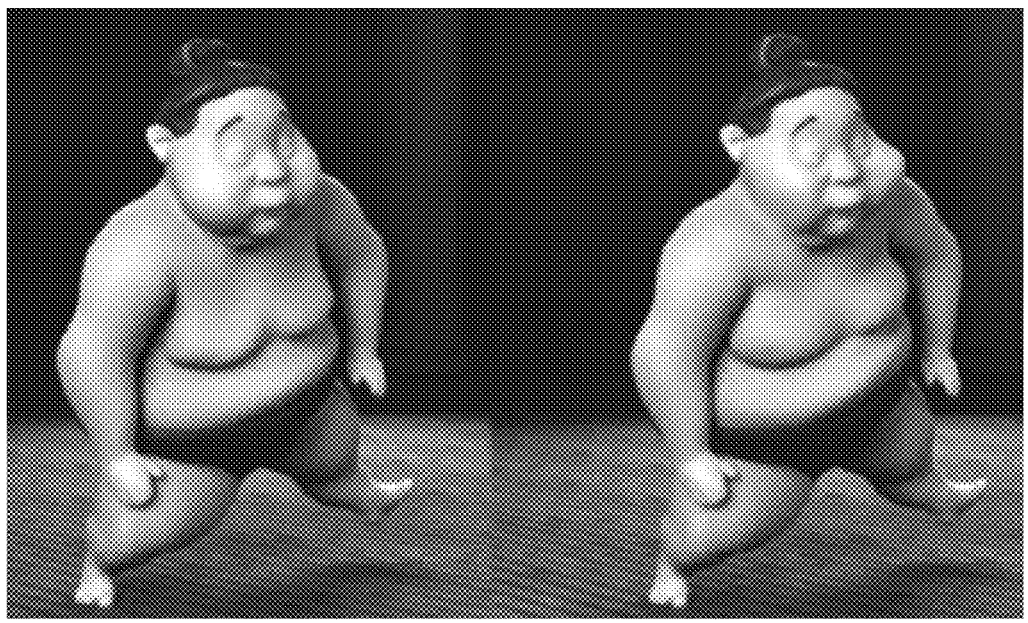

FIG. 14

FAST RIG-BASED PHYSICS SIMULATION

CROSS-REFERENCE TO RELATED APPLICATIONS

This application is a continuation-in-part of application Ser. No. 13/843,856, filed Mar. 15, 2013 and entitled "Rig-Based Physics Simulation," which claims priority to U.S. Provisional Application No. 61/751,747, filed Jan. 11, 2013, which are incorporated herein by reference as if fully set forth herein.

TECHNICAL FIELD

The present disclosure relates generally to computer animation, and, more particularly, to a method for performing physics-based simulations on an animator's rig.

DESCRIPTION OF THE RELATED ART

Character animation is a vital component of contemporary computer games and film productions. Deformation is encoded in the rigging stage when artists carefully design the character's range of meaningful deformations in terms of a low-dimensional set of intuitive control parameters. The character's movement is determined during the animation phase, when animators set values for the control parameters over time in order to bring the character to life and make it act.

BRIEF SUMMARY OF THE DISCLOSURE

A method is disclosed that brings the benefits of physics-based simulations to traditional animation pipelines. Equations of motion are formulated in the subspace of deformations defined by an animator's rig. The framework fits into the workflow typically employed by artists, as the output consists of animation curves that are identical in nature to the result of manual key framing. Artists are therefore capable of exploring the full spectrum between hand-crafted animation and unrestricted physical simulation. To enhance the artist's control, a method is provided that transforms stiffness values defined on rig parameters to a non-homogeneous distribution of material parameters of the underlying finite element method (FEM) model. In addition, automatically extracted high-level rig parameters are used to intuitively edit the results of our simulations, and also to speed up computation. In the absence of artist input, realistic passive motion is created directly in rig space.

One embodiment of the disclosed method comprises receiving an articulated animation rig, the rig having a plurality of controls, the controls at least partially defining a deformation space. A physics-based simulation is performed, the simulation being constrained by the deformation space of the rig. Keyframes are generated on some or all of the controls as a result of the simulation. In a more particular embodiment, the method further comprises receiving material stiffness data on a subset of the rig controls, wherein the simulation is both constrained by the deformation space and influenced by the material stiffness data.

In a further aspect, the disclosed method may further comprise calculating a linear approximation of the articulated animation rig. The disclosed method may also comprise eliminating a subset of surface vertices. The disclosed method may also comprise deferred Jacobian evaluation. The deferred Jacobian evaluation may be performed by including a Jacobian error indicator, such that when the Jacobian error indicator signals a low degree of nonlinearity, the Jacobian is not recomputed, and when the Jacobian error indicator signals a high degree of nonlinearity, the Jacobian is recomputed. When the Jacobian is not recomputed, the simulation may step forward using a linear approximation.

The present disclosure is also embodied in a non-transitory computer readable medium comprising an instruction set configured to cause a computing device to perform the steps of the disclosed methods.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

FIG. 8 illustrates an example of different inverse kinematics edits at deformation handles depicted as spheres.

FIG. 11 illustrates an example of a "shaking" process for generating example pose data, in accordance with an embodiment of the systems and methods described herein.

FIG. 12 provides an example algorithm that may be used for implementing sparse correspondence, in accordance with an aspect of an embodiment of the systems and methods described herein.

FIG. 13 provides computation time data for different embodiments of the systems and methods described herein.

FIG. 14 illustrates a sumo wrestler animation ("Sumone") demonstrating the results of an efficient rig-based physics embodiment of the systems and methods described herein.

DETAILED DESCRIPTION

1. Introduction

Character animation is a vital component of contemporary computer games and film productions. For animated movies in particular, a character's deformation and movement are both critical to convey its personality and style. Deformation is encoded in the rigging stage when artists carefully design the character's range of meaningful deformations in terms of a low-dimensional set of intuitive control parameters. The character's movement is determined during the animation phase, when animators set values for the control parameters over time in order to bring the character to life and make it act.

Believable and compelling animation, however, requires careful consideration of the complex physical forces involved in movement in order to give weight and substance to an otherwise empty and weightless shape. Manual keyframe animation affords the greatest degree of creative freedom and permits extremely expressive animation. However, grounding this expressive acting with physically realistic motion due to inertia, deformation propagation, or collision reaction can be extremely cumbersome and time consuming. Physics-based methods excel at creating such realistic effects, but are inherently difficult to control and do not respect the style of deformation chosen for the character and encoded in its rigging controls. This disconnect between the workflow used by artists (manually keyframing a small set of rig parameters) and the output of physics-based simulations (a high number of independent degrees of freedom) limits the effectiveness of physical simulation in the animation pipeline. To date, artists must choose between laboriously keyframing physical effects or employing physics-based tools that offer limited control and may not respect the character's range of meaningful deformations.

Figure 1:
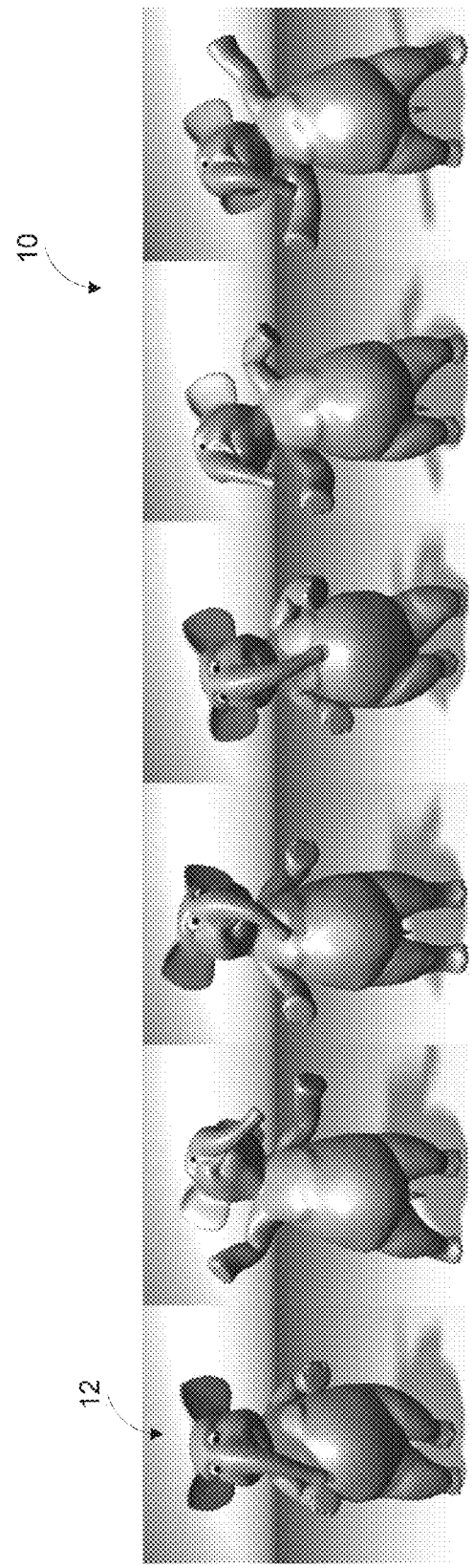
FIG. 1 illustrates a set of sample keyframes generated by receiving a character rig and a set of keyframes for some of the rig's parameters, then automatically producing animation curves for the remaining parameters.

In one embodiment, the present disclosure unifies keyframing and physical simulation to create physically realistic motion of rigged characters. To this end, an underlying representation of the character may be created based on an elastic deformable material. The dynamics of the character may then be simulated in the subspace of deformations described by the character's rig. The disclosed method may treat all rigging controls in a unified manner and thus works with skeletons, blend shapes, spatial deformation fields, or any other rigging procedure. Moreover, the output of the disclosed method may consist of animation keyframes for the rig parameters, making editing convenient for the artist. A sample result of this method is provided in FIG. 1. FIG. 1 provides a set of screenshots 10 in which the disclosed system was provided an elephant character rig 12 and a set of keyframes for some of the character rig's parameters. Animation curves are automatically produced for the remaining parameters by solving the equations of motion in the space of deformations defined by the rig. The resulting motion is physically plausible, maintains the original artistic intent, and is easily editable.

The disclosed approach can provide artists with a tool to continuously move in the spectrum between fully controlled hand-animation and free physical simulation. The present disclosure demonstrates one embodiment of the method as a plugin to a general-purpose 3D animation software and results are demonstrated on complex characters using a variety of real-world rigging controls. Further, the basic framework may be extended in the following ways:

Rig-space Materials: A novel approach is presented to define material stiffness values directly on the rig parameters by inferring the required stiffness distribution on the background finite element mesh.

Physics-based High Level Rig Parameters: Analyzing physical deformations computed with the disclosed framework yields a set of high-level rig parameters that capture the main dynamic behavior of the simulated character. This enables artists to intuitively edit the output of the disclosed system by modifying only a small number of animation curves. Creating new motions in this new reduced parameter space results in significant performance gains, while maintaining the expressive power of the original set of parameters.

Physics-based Inverse Kinematics: The physical background model allows a user to decouple the way in which deformation is measured from the actual rig and therefore enables the user to perform inverse kinematics on any kind of rig construction. Artists may pose the entire character by specifying only the position or value of isolated handles/parameters, with the remaining parameter values then being obtained by minimizing the elastic energy in rig space, as will be discussed in greater detail below.

2. Related Work

Rigging a character typically refers to the process of embedding a skeleton in a surface mesh and defining how the mesh vertices are transformed according to skeletal motions. In this disclosure, the term is used in a more general way to denote a nonlinear mapping between a low-dimensional space of rig parameters and a high-dimensional surface mesh. In practice, this mapping takes many forms, including, but not limited to, Linear or Dual Quaternion Skinning, skeleton-based methods, wire deformations, nonlinear functions, blend shape animation, cage-based methods, and free-form deformation, all of which are implemented in some form in modern animation software. Many of these techniques are complementary and there is no single best solution for all applications. Furthermore, which of the techniques are eventually used also depends on other factors such as personal preferences. Since such a wide variety of rigging methods exists, the disclosed rig-based physics method has been designed to treat the rigging system as a black-box so that it can work with any of the methods mentioned above. Consequently, the present disclosure does not make any assumptions on the underlying rig and evaluates the rig and its derivatives through function calls to the modeling/animation software.

The present formulation is grounded on continuum mechanics principles, and its well-established discretizations. In addition, the formulation enables the use of any nonlinear rig as a black-box. Moreover, the disclosed system performs principal component analysis (PCA) in the parameter domain of the animator's rig, which results in an arbitrarily nonlinear mapping between rig parameters and vertex coordinates. Thus, expressive physical deformation modes can be extracted which are linear in rig space but still very expressive due to the rig's nonlinear nature.

3. Rig-Based Simulation

In order to formulate the dynamics of deformable objects in the subspace of deformations defined by an animation rig, the first consideration is to establish the deformable materials' equations of motion (EOM)

$$\rho \ddot{x} = f(x)$$

for the continuous solution x(X, t), where X are the coordinates of the undeformed configuration, t denotes time, ρ describes the mass density of the material and f(x) represents the internal and external force densities acting on the system. While conventional simulators typically discretize these equations (EOM) in space first, the disclosed method first discretizes in time. The unconditionally stable implicit Euler integration scheme is chosen $$\rho\left(\frac{x_{n+1} - x_n}{h^2} - \frac{v_n}{h}\right) = f(x_{n+1})$$

where h is the size of the timestep. This specific choice of time integration allows for the problem to be examined in its variational form as the minimization of the following non-linear function:

$$H[x_{n+1}] = \frac{\rho h^2}{2}\left|\left(\frac{x_{n+1} - x_n}{h^2} - \frac{v_n}{h}\right)\right|^2 + W(x_{n+1}),\quad\text{Equation (1)}$$

where W represents the sum of internal and external potential energy densities $W_{int} + W_{ext}$ such that $-\partial_x W = f$. The external potential energy density accounts for the effects of gravity and penalty-based collisions.

Using this variational form, an appropriate spatial discretization can now be chosen to obtain the final formulation of the equations of motion for deformable objects. It is noted that performing the temporal and spatial discretization in this order is very convenient when choosing a nonlinear subspace for the spatial discretization, which is the case for the problem formulation of the disclosed method. This point will be discussed in more depth later on, when the ingredients for certain embodiments of the simulation environment are described in greater detail.

The system may take as input an arbitrary character rig, and optionally, prescribed keyframed trajectories for a subset of the rig parameters. The dynamics formulation operates on the remaining subset of "free" rig parameters, as discussed in the remainder of this disclosure. After every time step, the values output for these rig parameters are recorded. This results in animation curves similar in nature to those that an artist might create through keyframing.

The input animation rig can be treated as a black-box, nonlinear mapping between rig parameters p and the rigged surface mesh s. In other words, it can be assumed that the system only has access to the map $$p \to s(p). \quad\text{Equation (2)}$$

This increases the generality of the approach, making it applicable to virtually any type of rig parameterization. As will be described shortly, the disclosed method may receive the derivatives of the map $$\frac{\partial s}{\partial p} \text{ and } \frac{\partial^2 s}{\partial p^2}.$$

Alternatively, if these are not provided with the rig, then they may be estimated using, for example, finite differences. In this way, the method may be used with standard animation packages such as Maya.

To spatially discretize the variational problem (1) and make use of the provided rig parameterization (2) the standard FEM procedure is followed. First, the volumetric problem domain Ω is divided, which is bounded/defined by the input surface mesh, into a set of distinct finite elements with nodal degrees of freedom (DOFs) x. The effect of the rig on the deformable object may be captured by ensuring that a subset of the nodal DOFs come from the rigged surface mesh that is provided as input:

$$x = \{n\} \cup \{s\}$$

The internal nodal DOFs n may be used in order to ensure a good-quality space discretization irrespective of the input rigged surface mesh. In addition, it should be noted that they are independent of the rig parameters p, because the input rig generally deforms just a surface mesh (i.e. mesh vertices s), and not an arbitrary volumetric region in space. The volumetric solution field approximating the continuous solution x is given by $$x(X) \approx \sum_i x_i N_i(X) = \sum_j n_j N_j(X) + \sum_k s_k N_k(X)$$

where N(X) are basis functions associated with the nodal DOFs.

This formulation may be independent from the actual FEM discretization or material model chosen, as long as the nodal degrees of freedom s can be incorporated. For simplicity tetrahedral elements may be chosen with linear basis functions in combination with standard Saint-Venant Kirchhoff or Neo-Hookean material models for the internal energy density $W_{int}$. Specifically, this allows replacement of the continuous mass and energy densities with their discrete counterparts $$\rho \to M_n, M_s$$

$$W(x(X)) \to W(n, s),$$

where standard mass lumping is used. Further, this allows reformulation of (1) in this discrete setting as $$H(n, p) = \frac{h^2}{2}\left(\frac{n - n_n}{h^2} - \frac{v_n}{h}\right)^T M_n \left(\frac{n - n_n}{h^2} - \frac{v_n}{h}\right) + \\ \frac{h^2}{2}\left(\frac{s(p) - s_n}{h^2} - \frac{w_n}{h}\right)^T M_s \left(\frac{s(p) - s_n}{h^2} - \frac{w_n}{h}\right) + W(n, s(p)), \quad\text{Equation (3)}$$

where v and w are the velocities of n and s, respectively, and the subscript n indicates the previous time step. To perform simulations in the reduced subspace provided by the rig, Eq. (3) may be minimized as a function of the interior vertices n and rig parameters p, as described in Section 4.

There are many options when it comes to deriving the algorithmic framework for reduced subspace simulators. The classic Lagrangian mechanical derivation of reduced space mechanics starts from a formulation of kinetic and potential energy in reduced coordinates and derives the continuous EOMs by formulating the Euler-Lagrange equations of the action integral. Formulating the action integral directly in the reduced, non-linear subspace (as opposed to the usual flat Sobolev space $H_1(\Omega)$), results however in more involved formulations than the one used here. The additional complexity is reflected in higher-order curvature terms that account for the non-linearities in the solution manifold. One way of circumventing this additional complexity is to use a linear subspace. While this greatly simplifies simulations in reduced spaces, a large number of dimensions may be needed in order to capture interesting dynamic behaviors. In addition, since the simulation subspace is provided in the form of an animation rig, which, more often than not is non-linear, this is not an option for the problem addressed here.

By considering a first-order, implicit time integration scheme from the start and formulating the corresponding variational form before performing the spatial discretization into a nonlinear subspace, a much simpler formulation is found that does not require higher order derivatives at the current timestep. The curved, non-linear manifold may instead be approximated by additional information from the last discrete timestep $(x_n, v_n)$ and the temporal finite difference approximation. Such a scheme is simple to implement, while still exploiting the flexibility of nonlinear solution subspaces.

4. Minimization

The problem formulation derived in the previous section allows the timestepping procedure to be described as a minimization of the nonlinear objective function presented in Eq. (3). In order to efficiently minimize this objective for each timestep, a Newton-Raphson minimization scheme can be extended to achieve better performance for the specific setting presented here.

A first condition for a minimum may be stated as $[\partial_n H, \partial_p H]^T = 0$, corresponding to the conventional equations of motion for interior vertices $$\partial_n H = M_n \left( \frac{n - n_n}{h^2} - \frac{v_n}{h} \right) + \partial_n W(n, s(p)) = 0$$

as well as rig parameters $$\partial_p H = J_n(p)^T M_s \left( \frac{s(p) - s_n}{h^2} - \frac{w_n}{h} \right) + J_s(p)^T \partial_s W(n, s(p)) = 0$$

where the notation $J_s(p) = \partial_s / \partial_p$ is used. In order to solve this coupled system of nonlinear equations using a Newton scheme, correction directions $[\Delta n_k, \Delta p_k]^T$ can be solved for in each iteration by solving the linear system $$\begin{bmatrix} H_{nn} & H_{np} \\ H_{pp} & H_{pp} \end{bmatrix} \begin{bmatrix} \Delta n_k \\ \Delta p_k \end{bmatrix} = - \begin{bmatrix} \partial_n H \\ \partial_p H \end{bmatrix}, \quad \text{Equation (4)}$$

that involve second derivatives of the objective function. They are given analytically as $$H_{nn} = \frac{1}{h^2} M_n + \partial_{nn} W(n, s(p)) \quad \text{Equation (5)}$$

$$H_{pn} = J_s(p)^T \partial_{sn} W(n, s(p))$$

$$H_{pp} = J_s(p)^T \left( \frac{1}{h^2} M_s + \partial_{ss} W(n, s(p)) \right) J_s(p) +$$

$$\partial_p J_s(p)^T M_s \left( \frac{s(p) - s_n}{h^2} - \frac{w_n}{h} \right) + \partial_p J_s(p)^T \partial_s W(n, s(p)).$$

Once the correction directions are computed, a line search method may be used to find an appropriate scalar value $\alpha$. The updated values for the unknowns n and p are then given by:

$$n_{k+1} = n_k + \alpha_k \Delta n_k$$

$$P_{k+1} = P_k + \alpha_k \Delta P_k$$

Figure 2:
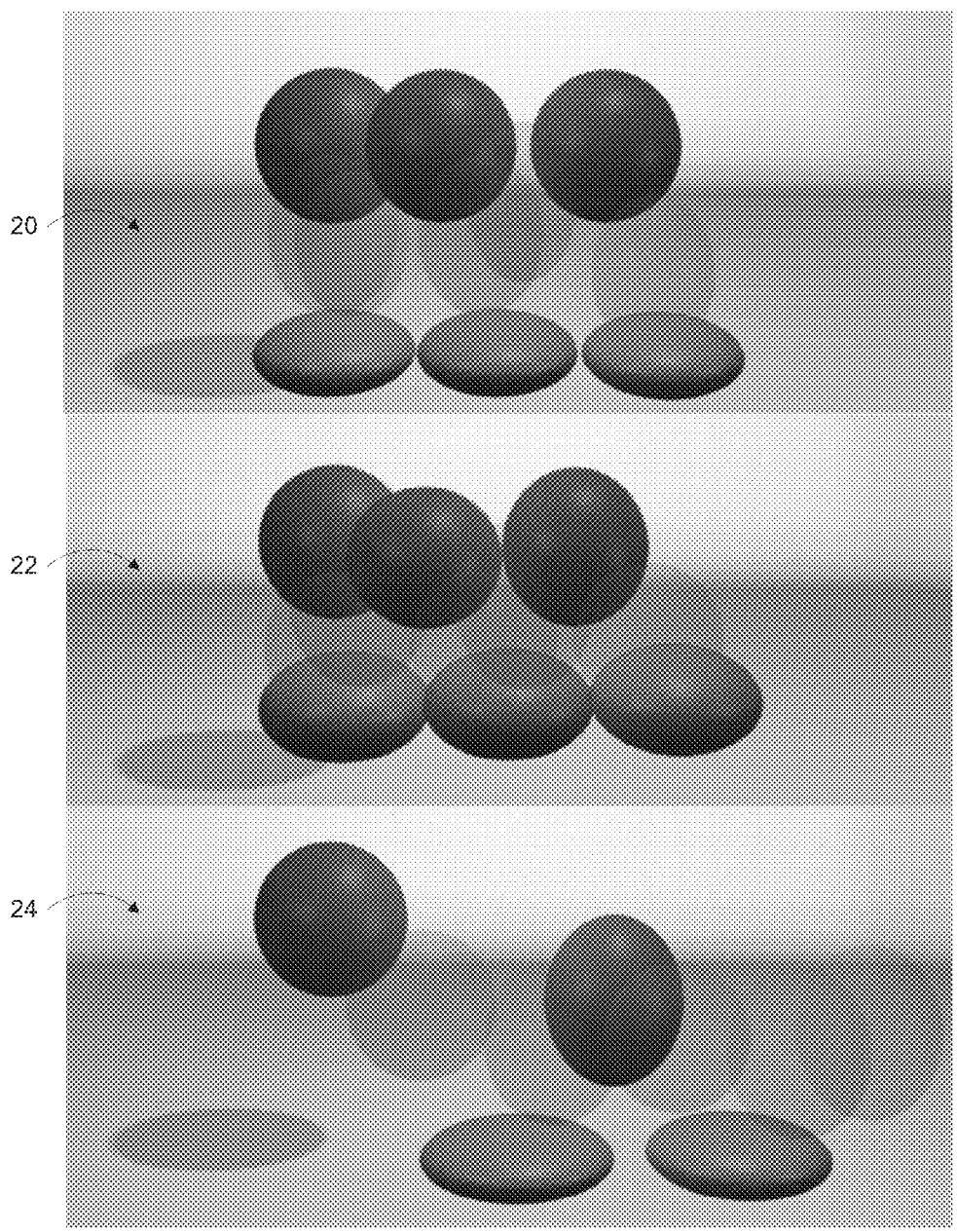
FIG. 2 illustrates an example animated sphere with an artist-created animation (top), a global translation with scaling parameters simulated (middle), and all rig parameters simulated (bottom).

The line search parameter $\alpha_k$ may be computed by performing cubic interpolation to previous function and gradient evaluations while satisfying the Wolfe conditions for sufficient descent. An example of this approach applied to a rigged sphere is shown in FIG. 2, in which a sphere with scaling and global translation rig parameters is depicted. The top row 20 is an artist-created animation. The spheres in the middle row 22 have constrained global translation with scaling parameters being simulated. Finally, in the bottom row 24, all the rig parameters were simulated.

Evaluating second derivatives analytically can be computationally expensive when a black box rig is used, as the Jacobian derivatives $\partial_p J_s(p)$ need to be approximated with finite differences. This results in $p^2$ rig evaluations s(p) for each Newton iteration.

Due to this fact, it may be advantageous to choose solutions that require as little use of the black box rig as possible. If analytic rig Jacobians are not provided, superlinearly convergent quasi-Newton methods may be used, such as the Broyden-Fletcher-Goldfarb-Shanno (BFGS) method. This method updates an approximate Hessian $\tilde{B}_{k+1}$ at each Newton step by using a series of rank-2 updates involving the gradient:

$$\tilde{B}_{k+1} = \tilde{B}_k + \frac{y_k y_k^T}{y_k^T d_k} - \frac{\tilde{B}_k d_k d_k^T \tilde{B}_k}{d_k^T H_k d_k}$$

where $d_k = [\Delta n^T, \Delta p^T]^T$ and $y_k$ is the gradient difference between the current and the last iteration's gradient of H. The BFGS method may be used to update the $H_{pp}$ block of the full system Hessian. $H_{nn}$ is much larger, sparse, and easy to evaluate analytically. The performance gained by reducing the number of calls to the black box rig can be weighed against the loss in convergence introduced by using approximate Hessians.

The blocks of the system matrix in Equation (4) have different sparsity structures. While $H_{nn}$ is very sparse, the blocks $H_{pn}$ and $H_{pp}$ are dense due to the subspace projection with $J_s$. Naively solving this system can lead to poor performance of either iterative or direct solvers.

A Schur complement decomposition of the linear system can be performed in order to separate the dense and sparse blocks. This may be done by performing a Block-Gauss elimination of Equation (4), and thus solving the following equations in sequence $$(H_{pp} - H_{pn} H_{nn}^{-1} H_{np}) \Delta p = \partial_p H - H_{pn} H_{nn}^{-1} \partial_n H$$

$$H_{nn} \Delta n = \partial_n H - H_{np} \Delta p.$$

Since $H_{nn}$ can be prefactored by a direct linear solver, the separate solves required on the relatively small number of columns of $H_{np}$, $\partial_n H$ as well as in the second equation, can be performed efficiently using back substitution. Given that the number of parameters of typical animation rigs is relatively small, the cost of the dense solve required to compute $\Delta p$ is negligible.

5. Rig-Space Material Control

As discussed thus far, in one embodiment, the input to the disclosed system may consist of an animation rig and a surface mesh. The surface mesh can be used to define the deformable object that drives the dynamic behavior of the simulation. The material properties of this deformable object can have a large influence on the motions resulting from the system. It is therefore very important to provide an intuitive way for the user to manipulate these parameters. A simple approach would be to allow users to manually adapt the material properties of the simulated finite element mesh, which could be done, for instance, by using a painting interface. This would require an intimate knowledge of the underlying dynamical model, the meaning of the various material parameters, and the coupling between the rig and the simulated object.

To simplify these issues, a novel approach may be used that allows novice users to intuitively influence the material parameters directly in rig-space. This disclosure provides a way for artists to define a stiffness scale value $S_i$ for each rig parameter $p_i$, that roughly corresponds to its desired stiffness relative to the default stiffness of the homogeneous material chosen for the FEM model.

In an initial analysis step, an inhomogeneous stiffness scale distribution $\mu_e$ can be computed over all simulation elements that results in the desired behavior for the rigged object. The distribution found in this step does not change the simulation framework. It only affects the stiffness of the material used during simulations.

Technically, this may be achieved by treating the interior vertices n not as independent DOFs, but as being always in static equilibrium given the boundary conditions defined by the rigged surface points s(p). In other words, every FEM node may be treated as if it was directly controlled by the rig q(p)=(n(p), s(p)). While this explicit map is only known through a nonlinear static solve, it allows analysis of the influence of each rig parameters on the deformation of the entire FEM mesh geometry, and not only the rig-controlled boundary. The derivative of this map may be defined as $$J_q = \frac{\partial q}{\partial p}$$

which can be evaluated with finite differences.

At the rest configuration, q(0), internal elastic forces are zero and their rate of change is described locally by the tangent stiffness matrix $\partial_{qq} W_{int}$. According to Equation (5), and only considering contributions due to internal potential energy, the Hessian $H_{pp}$ becomes:

$$H_{pp} = J_q^T \partial_{qq} W_{int} J_q,$$

where $\partial_{qq} W_{int}$ describes the energy Hessian with respect to all mesh DOFs. The columns of this Hessian describe how a change $\Delta p$ introduces restoring generalized forces $f_p$ that act on the rig parameters as $f_p = -H_{pp} \Delta p$. These restoring generalized forces may be automatically scaled using the user-specified rig-space material parameters $S_i$.

An alternate way of assembling the Hessian $H_{pp}$ is to consider the per element energy contributions $\partial_{qq} W_e$:

$$H_{pp} = J_q^T \left( \sum_e \partial_{qq} W_e \right) J_q = \left( \sum_e J_q^T \partial_{qq} W_e J_q \right).$$

In this formulation, the scaling factors $\mu_e$ can now be introduced, for which the aim is to compute per element. These scaling factors have the effect of stiffening or softening each element individually. Formally, it is asked that:

$$SH_{pp} = \Sigma_e J_q^T \partial_{qq} W_e J_q \cdot \mu_e \quad \text{Equation (6)}$$

where S is the diagonal scaling matrix containing the desired rig stiffness scales $S_i$. In most cases, this is an underdetermined linear system with $p^2/2$ equations and #e unknowns. This system may be solved in a least squares sense using a quadratic programming approach, where there exist inequality constraints $u_e \geq 0$ to obtain positive element stiffnesses and a simple $L^2$-regularizer $\Sigma_e r(\mu_e - 1)^2$ that encourages the use of the default material stiffnesses.

Figure 3:
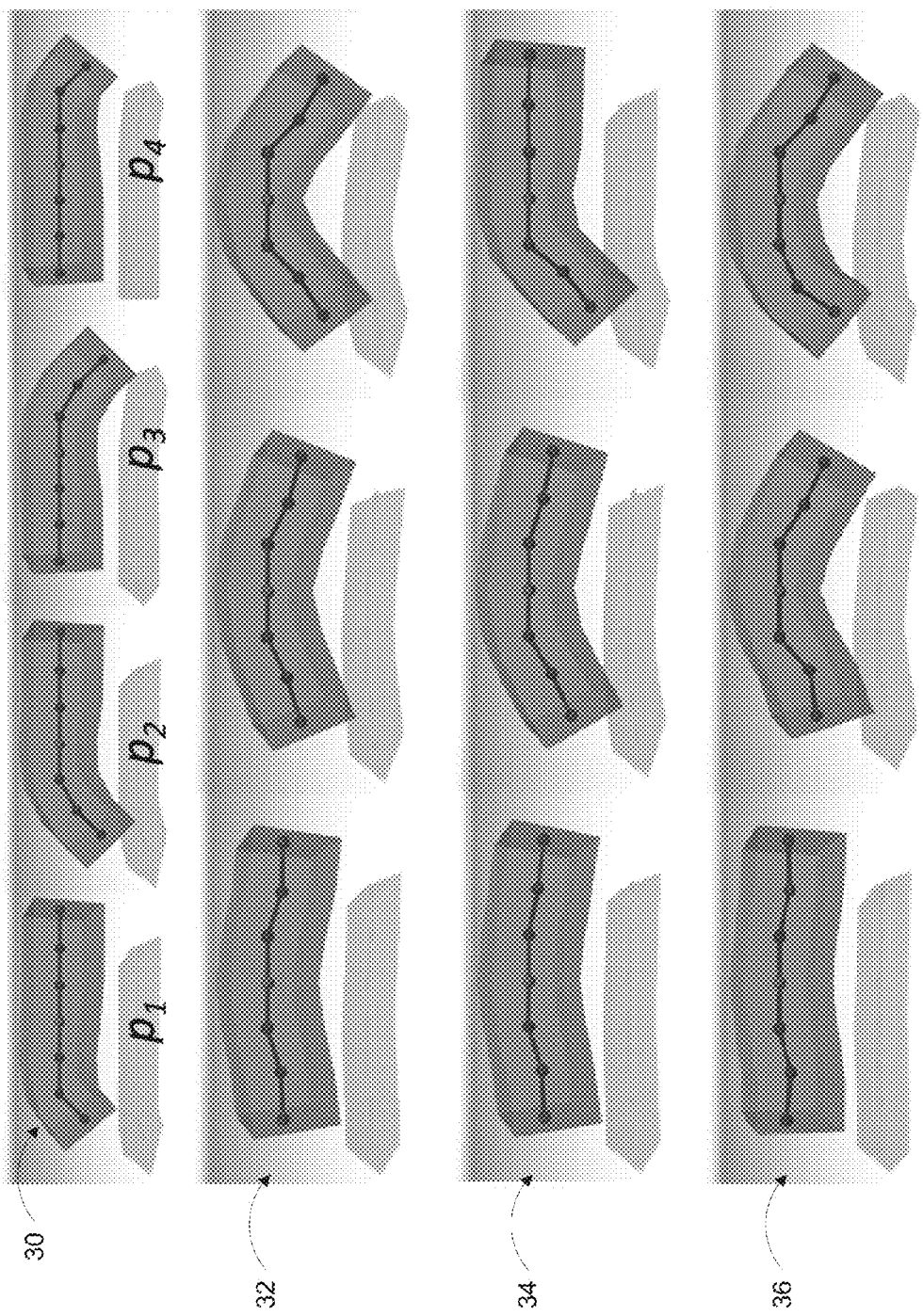
FIG. 3 illustrates a set of elastic bar animation rigs simulated with varying stiffness values.

Geometrically speaking, this approach can anisotropically adapt the elastic energy landscape around the rest shape in order to reflect the desired scaling of the generalized forces. While this analysis may be performed only in the neighborhood of the undeformed configuration, intuitive resulting behaviors for large deformations have also been observed. The example shown in FIG. 3 demonstrates the effectiveness of this method. In FIG. 3, an elastic bar 30 is rigged by four rig deformation modes, affecting the outmosts ($p_1, p_4$), and the combination of the two outer joints ($p_2, p_3$) respectively. In the second row 32, homogeneous materials result in symmetric deformations. In the third row 34, stiffening $p_3$ and $p_4$ results in overall stiffer right part of the bar. In the fourth row 36, stiffening only $p_4$ leads to the expected behavior despite the influence region of $p_3$.

6. Extensions

In the previous sections the simulation framework was described that operates directly in the space of deformations defined by an animation rig. In this section several extensions are discussed that increase the usefulness of the disclosed method.

The disclosed rig-space simulation framework allows a user to easily define high-level rig parameters that combine several low-level deformers. These high-level parameters are often more intuitive to use, as they capture synergies that naturally occur in the motions being created. Such high-level rig parameters capture the main physical deformation modes that the underlying physical object induces on the rig parameters. The high-level parameters exposed to the artist can be used for manual editing of physically-plausible motions or as a further reduced subspace that significantly increases the speed of the simulations.

The results of the simulation in rig-space, $p_i$, provide a space that already captures the non-linearities in vertex space (i.e. $s_i$). An analysis may be performed on data stemming from our rig-space simulation. Alternatively, existing animations can be used to build a model of the rig parameter coupling that artists are accustomed to using.

Figure 4:
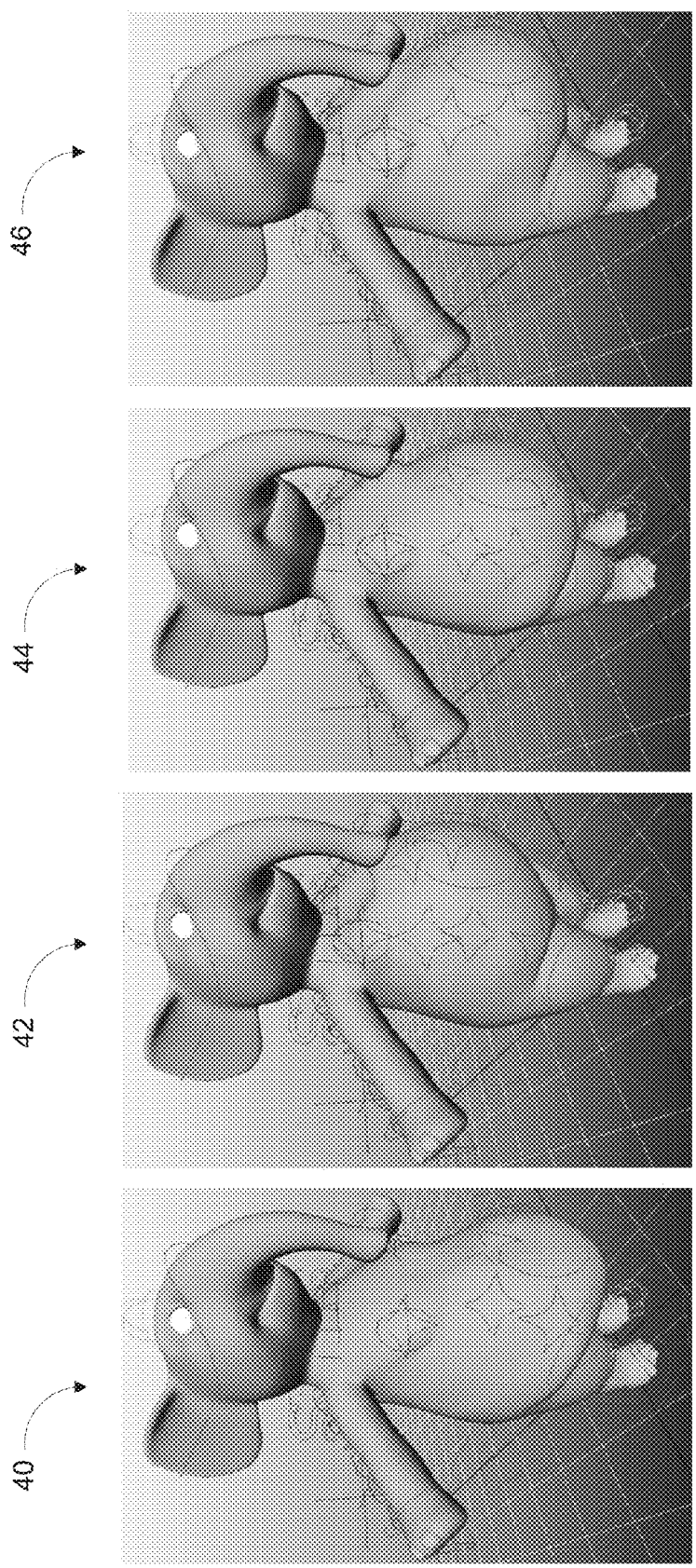
FIG. 4 illustrates a set of four elephant walk animations demonstrating different deformation modes obtained by performing physically-based high-level rig parameter computations.

Since it is desirable for the undeformed configuration p=0 to always be representable in the reduced rig subspace, it can be chosen for the rig parameters p to be represented by the span of column vectors of U, i.e., the representation $$p = Ur,$$

is chosen. The columns of U may be computed straightforwardly as the right singular vectors of the data matrix $P = [p_1, \ldots, p_m]$. As an illustration, different deformation modes obtained by performing this analysis on the belly motion for the elephant walk cycle are given in FIG. 4. For this example, 30 parameters were initially simulated. PCA modes for the elephant's belly rig parameters are provided. The left two images, 40, 42, depict a first mode characterizing vertical motion, while the right two images 44, 46 depict a second mode for horizontal motion.

As already mentioned, these physically-based high-level rig parameters r can be used as a further reduced subspace in order to speed up simulations. Incorporating this subspace into the formulation is very simple: p is simply replaced by Ur in the discrete simulation energy (3) and the chain rule is applied correspondingly for its derivatives.

Inverse kinematics is the process of computing state variables to satisfy higher-level kinematic. A key ingredient of such systems is the definition of a quality measure that eliminates the redundancy that exists when there are more degrees of freedom than there are goals. The physical energy model W(n, s(p)) formulated in rig-space can be naturally used as such a quality measure, independently of the type of rig that is provided as input. Because the physical energy model measures internal deformation on the simulation FEM mesh, virtually all types of rigging methods can be collectively treated in a unified manner. By minimizing $$\min_{p,n} H(n, s(p)) + \alpha \sum_{k \in H} |s_k(p) - h_k|^2, \quad \text{Equation (7)}$$

where H is a set of handles, the best configuration of rig parameters can be found such that the surface points $s_k$ are as close as possible to the goal positions $h_k$. Using a flexible formulation of H, this inverse kinematics solver can be applied for static modeling but also to add dynamic effects when the momentum terms are considered.

The energy-based formulation defined in (3) allows for switching between dynamic and static solves. The difference between the two consists of the additional momentum terms which can be omitted for static problems.

Since we decouple the treatment of the rigged vertices s(p), and the interior vertices n, this formulation allows for use of different solvers for the two classes of degrees of freedom. It is possible, for instance, to use a static solve for the interior vertices, while using a dynamic solve for the rig parameters. In this case, during each time step, the interior points aim to reach a static equilibrium configuration due to absence of any mass and momentum. This strategy gives intuitive results for rigged objects that are meant to be more rigid. If, however, the mass term is kept for the interior points, more complex (and interesting) secondary motion effects may be achieved, such as waves that propagate through the solid and affect the free DOFs of the rigged surface. This approach works best for rigged objects that are meant to be softer. The option of using either strategy may be exposed as a high level control parameter to the users of the disclosed system.

7. Results

The disclosed framework provides animators with a helpful tool that can be used to enhance their existing rigged animations with physical effects and to create controllable animation of deformable objects. The approach is particularly attractive for animators since it can be seamlessly integrated in their workflow. As such, editing and post-processing of simulation results becomes as effortless as editing any other existing keyframed animation.

The effectiveness of the method is demonstrated by animating several simple rigs that are used to showcase various concepts. In addition, two artist created rigs, Prof. Peanuts and Flower, are animated.

Figure 5:
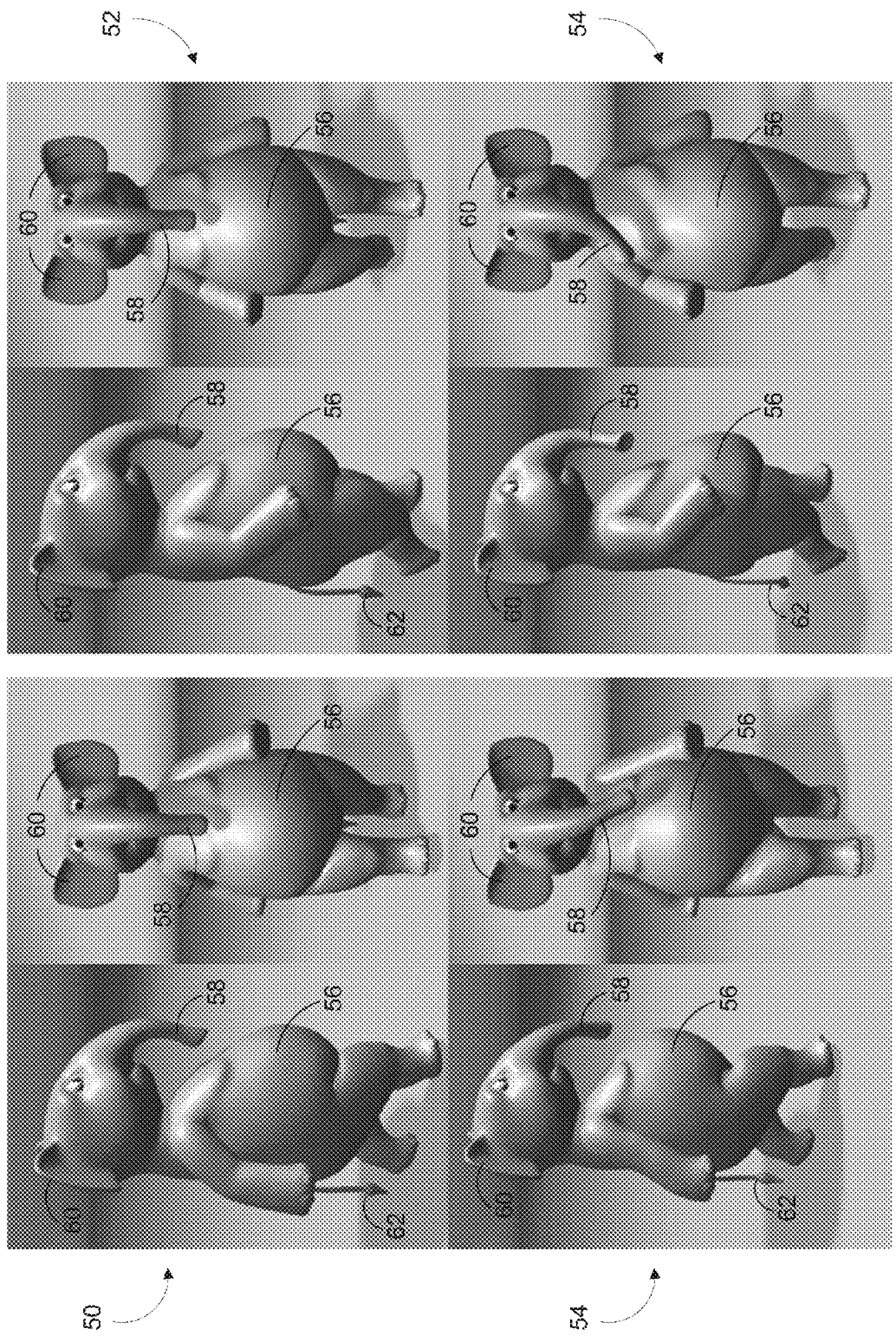
FIG. 5 illustrates a comparison of artist-generated animation examples (top row) and an animation in which (secondary) motion is computed automatically using the disclosed method (bottom row).

To demonstrate the benefit of the approach on a practical example, it is applied to an artist-created walk cycle animation of Prof. Peanuts. FIG. 5 compares a simulated animation to the coarse input animation provided by the artist. The top row provides two different views of two artist-rigged examples, 50 and 52. The bottom row 54 shows the result of the disclosed method with simulated rig parameters for the belly, shoulder, trunk, and tail. Simply specifying a subset of rig parameters to be simulated, in addition to the input animation, allows the disclosed framework to enrich the provided coarse motion with many interesting physical details. This can be seen in the motion of the belly 56, trunk 58, ears 60 and tail 62 of the elephant, which are largely absent in the artist-rigged examples 50 and 52.

Figure 6:
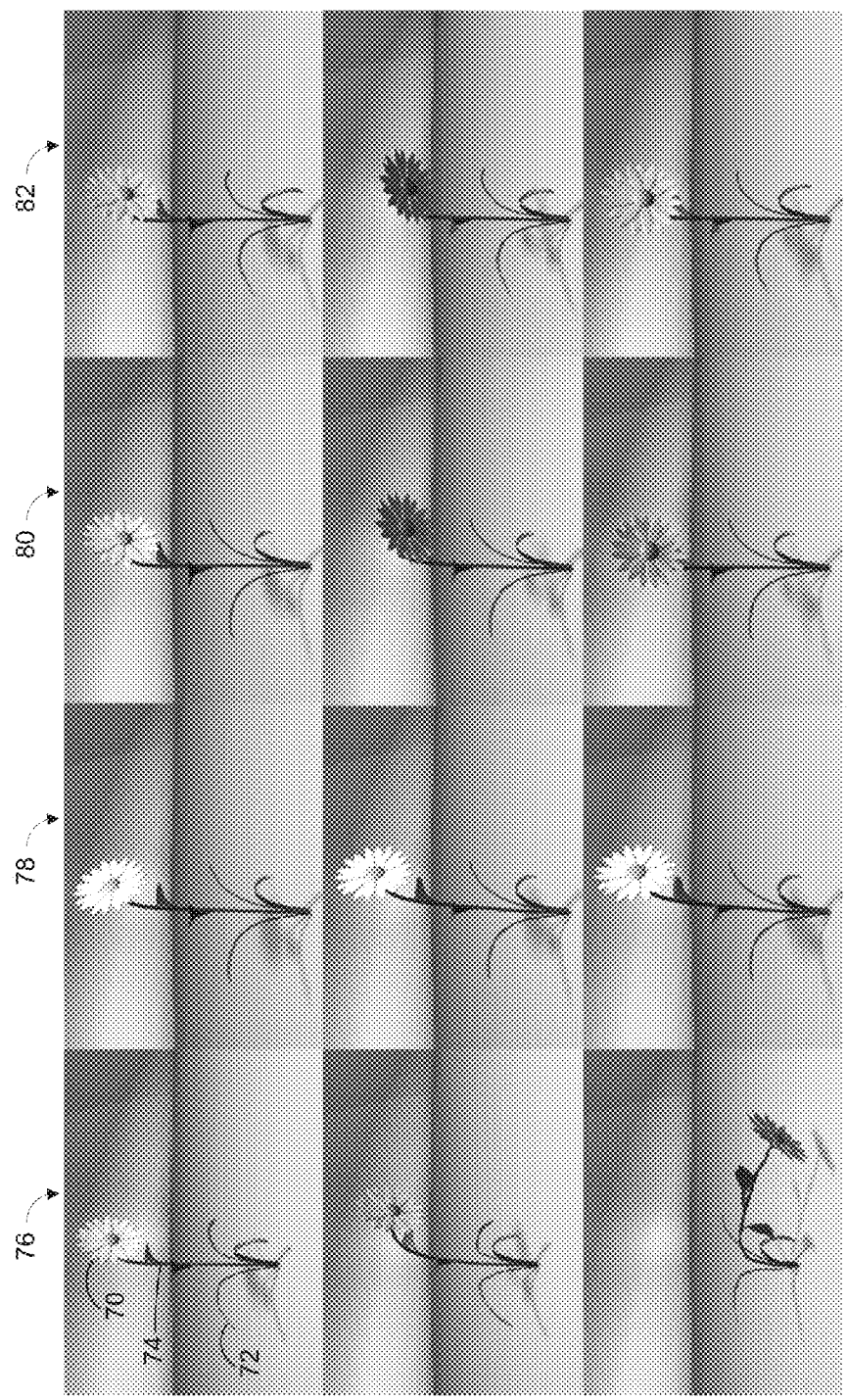
FIG. 6 illustrates a rigged flower simulated with different rig stiffness parameters.

The disclosed rig-based material model enhances the basic simulation framework presented in Section 3 by allowing the artist to specify individual stiffnesses for each rig parameter. This enriches the space of dynamic behaviors that can be generated and also allows for more accurate control over the elastic characteristics of individual parts of the rigged characters. FIG. 6 shows the approach applied to the Flower rig. In each column of FIG. 6, the rigged flower is simulated with different rig stiffness parameters. In the first column 76, the blossom 70, leaves 72, and stem 74 are all simulated as homogeneous soft material, resulting in the entire flower dropping. In the second column 78, the entire flower is simulated with homogeneous stiff material. In the third column 80, soft material is used for the blossom 70 while the leaves 72 and stem are stiff. Finally, in the fourth column 80, soft material is simulated for the blossom 70 and leaves 72, while the stem 74 is stiff. Neither uniformly stiff (78) nor uniformly soft (76) materials give satisfactory results. However, selectively weakening the blossom 70 and the leafs 72, while maintaining the stiffness of the stem 74, as in the fourth column 82, leads to a desirable behavior. While the present disclosure focuses on the more common scenario of receiving stiffness data for rig parameters, it should be understood that similar results may be achieved by specifying stiffness data directly on the surface mesh.

The disclosed rig-based approach also allows for a user to quickly iterate over animation sequences and simulate individual parts of the rig separately. Although this can potentially lead to a loss of interesting coupling between different parts of the rig, the gain in simulation speed can be significant. While using this mode of operation, the result of a previous simulation may be taken as an input keyframed sequence and treated as boundary condition for the free rig parameters. This technique has been applied for the sequence shown in FIGS. 1 and 5, which were discussed previously.

Figure 9:
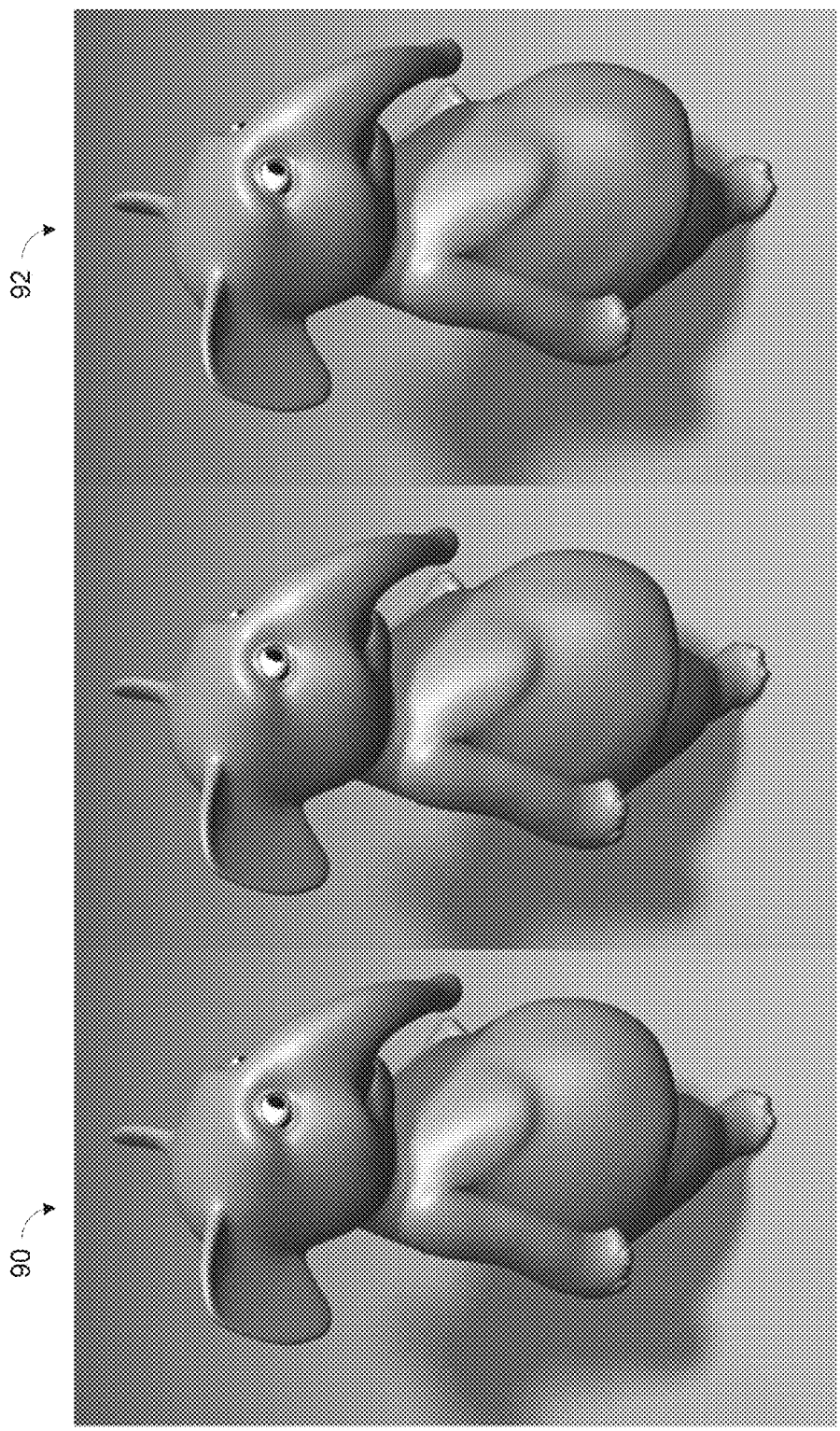
FIG. 9 illustrates a set of animations showing the effect of changing high-level rig parameter scaling to affect the animation.

To further enhance the artist's editing capabilities, and to enforce the concept of keeping the animator in the loop, a PCA-based approach automatically determines additional, physically meaningful control parameters. For the walk cycle example shown in FIG. 5, the main two modes capture most of the elastic deformation of the belly during the walk. By manipulating these high-level parameters, animators can easily edit the animation curves generated by our system, in order to emphasize or reduce their effect, as illustrated in FIG. 9. In FIG. 9, a high-level rig parameter is scaled up (90) and down (92) by a factor of 1.5 to amplify or attenuate the belly motion. This manual editing process allows for greater user control while still resulting in plausible-looking motions.

Figure 7:
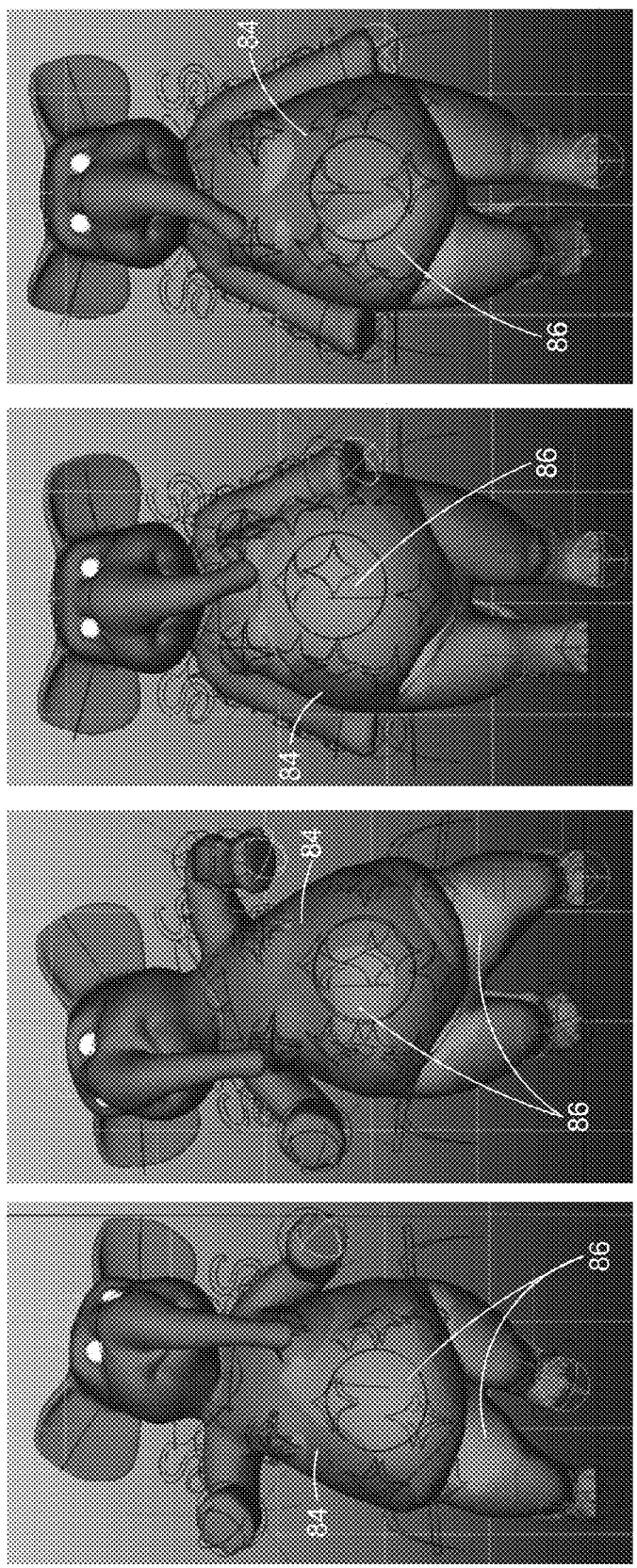
FIG. 7 illustrates a comparison of a simulation performed with a full set of parameters and a simulation performed using a reduced space of high-level rig parameters.

The high-level rig parameters exposed also provide a convenient space for simulations to work with. As will be discussed shortly, this significantly decreases the computational overhead of the disclosed method. However, it is important to ensure that this does not negatively impact the quality of results. To test this, the belly of the dancing elephant was simulated using the subspace built from the walk sequence of FIG. 5. The experiment was repeated by then animating the walk sequence using the subspace obtained by simulating the full set of belly parameters for the dance motion of FIG. 1. In both cases, the high-level rig parameters proved to generalize very well, and the visual differences between performing the simulations in the reduced space, or with the full set of parameters is almost unperceivable. This is illustrated in FIG. 7. The overlay of the darker original simulation 84 (thirty DOFs) and the lighter reduced simulation 86 (six DOFs) shows the good approximation quality of the high-level controllers.

Defining the elastic energy on the background FE mesh and working on abstract rig mappings s(p) allows for the performance of inverse kinematics operations on arbitrary rigged objects. The sequence in FIG. 8 was created by providing several handle trajectories using deformation handles 88, which are depicted as spheres, as described in Section 6. For the editing process, secondary motion can either be enabled or disabled (non-zero or zero mass matrices $M_n$ and $M_s$ in Equation 3, respectively), depending on the application.

Figure 10:
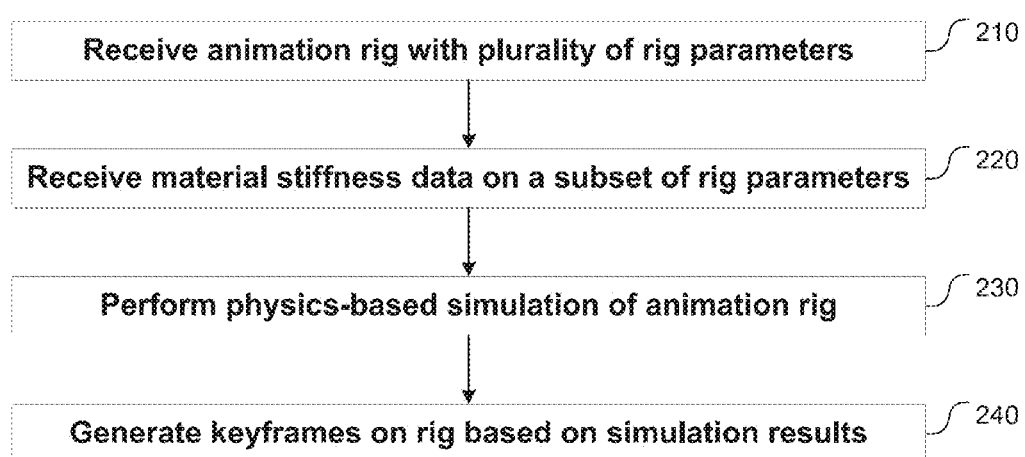
FIG. 10 illustrates an example process for generating keyframes on an animated rig in accordance with one embodiment of the systems and methods described herein.

FIG. 10 illustrates an example process for generating keyframes on an animation rig based on a physics-based simulation, in accordance with one embodiment of the systems and methods described herein. At operation 210, an animation rig comprising a plurality of rig parameters is received. This animation rig defines a deformation space for an attached surface mesh, the surface mesh comprising a plurality of nodes. At operation 220, material stiffness data is received on a subset of the rig parameters. At operation 230, a physics-based simulation is performed using the rig parameters and the material stiffness data. The simulation is constrained by the deformation space of the rig, as defined by the rig parameters, and the rigidity data influences the results of the simulation. Finally, at operation 240, keyframes are generated on the animation rig based on the results of the simulation run at operation 230.

7 Efficient Rig-Space Physics

The formulation disclosed above affords high-quality simulations of secondary motion and other physics-based detail in rig space, and represents a significant improvement on traditional rigging and keyframing methods. However, in certain embodiments, the algorithm may be computationally intense and give rise to certain inefficiencies. As such, an efficient rig space physics embodiment is described herein.

7.1 Efficient Rig-Based Physics Foundations

As described above, the input to the method is a rigged character, which is defined by a surface mesh with $n_s$ verticies $s=(s_1, \ldots, s_{n_s})^t$ and an abstract mapping $$p \rightarrow s(p) \quad \text{Equation (8)}$$

from a set of rig parameters p to corresponding deformed surface positions s(p).

As a basis for simulating secondary motion in rig space, it is assumed that the character can be modeled as an elastic solid. This solid is represented by a volumetric mesh with $n_e$ tetrahedral elements and $n_v$ vertices, each of which carries a mass $m_i$. The deformed and undeformed positions of the vertices are stored in vectors $x \in R^{3n_v}$ respectively $X \in R^{3n_v}$. The deformed positions are further decomposed into sets of $n_s$ surface verticies $s_i$ whose positions are directly controlled by the rig, and $n_i$ internal vertices $q_i$.

The behavior of the solid is governed by an elastic energy W(X, x), whose precise form is defined by a deformation measure and a material law. Letting $x^e=(x_1^e, \ldots, x_4^e)$ and $X^e=(X_1^e, \ldots, X_4^e)$ denoted the deformed, respectively undeformed positions of a given tetrahedral element, its deformation gradient is computed as $F=dD^{-1}$ where d and D are (3×3) matrices whose columns hold deformed and undeformed edge vectors $x_i^e-x_1^e$ respectively $X_i^e-X_1^e$ for $2 \leq i \leq 4$. Using a modified St. Venant-Kirchhoff material, the elastic energy density per element is obtained as $$W^e(x^e) = \frac{1}{2}\mu\|E\|_F + \lambda\left(1 - \frac{V^e}{V_0^e}\right) \quad \text{Equation (9)}$$

where $\|.\|_F$ is the Frobenius norm, $$E = \frac{1}{2}(F^tF - I)$$

is the Green strain, $V_e$ and $V_0^e$ are the deformed respectively undeformed volumes of the element, and $\mu,\lambda$ are material parameters. The elastic energy of the entire solid is obtained by summing up elemental contributes as $W=\Sigma_e W^e * V_0^e$. With the undeformed configuration fixed, the elastic energy is a function of only the deformed surface and internal vertices, W=W(s, q).

Assuming that a subset $p_s$ of the rig parameters is scripted over time as part of an input animation, the goal is to automatically compute the motion of the remaining rig parameters. Adopting the implicit Euler method, the above disclosed rig-based physics method solves time-stepping by minimizing the nonlinear functional $$H(p, q) = \frac{h^2}{2}(a_s^t M_s a_s + a_q^t M_q a_q) + W(s(p), q),$$

with respect to the free rig parameters $p_f$ and internal vertex positions q. In the above expression, $M_s$ and $M_g$ are diagonal mass matrices and the nodal accelerations are defined as $$a_s = \frac{1}{h^2}(s(p) - 2s_n + s_{n-1}), \quad a_q = \frac{1}{h^2}(q - 2q_n + q_{n-1})$$

where the subscripts refer to the time step index.

Certain embodiments of the disclosed method can be computationally intensive for two primary reasons. First, minimizing Equation 10 with a Newton-Raphson scheme requires first and second derivatives of the rig s with respect to its parameters p. Since the rig is generally not available in analytic form, these derivatives have to be estimated using finite differences for each iteration of the solver. Second, the dimension of the resulting system is comparatively high, considering that only the free rig parameters are required. An efficient embodiment of the disclosed method may be implemented by (a) establishing a linearized formulation, (b) eliminating the internal degrees of freedom using volumetric skinning, and (c) using a deferred Jacobian evaluation. This efficient implementation may be referred to as "fast rig-based physics" or "efficient rig-based physics."

7.2 Linear Rig Approximation

The fast rig-based physics simulation begins by linearizing the rig at the beginning of every time step as $$s(p) \approx s(p_n) + J(p_n)*(p-p_n), \quad \text{Equation (11)}$$

where $$J = \frac{\partial s}{\partial p}$$

is the Jacobian of the rig. The method may linearize only the rig but integrate the elastic energy exactly by solving a nonlinear system of equations. In this way, it is able to robustly handle cases in which the linear approximation of the rig becomes a threat to stability since such situations manifest as a significant increase in elastic energy and respective forces. As a direct computation advantage of the rig linearization, the Jacobian need only be evaluated once per time step and, what is more, second order derivatives of the right vanish altogether. Retaining the nonlinear elastic energy leads to improved stability and requires only a few evaluations of elastic energy gradients and Hessians, which is faster than evaluating J.

7.3 Physics-Based Volumetric Skinning

In the general rig-based physics method described above, potential problem variables consist of the rig parameters and the position of the internal vertices. Besides the fact that the internal vertices generally contribute significantly more degrees of freedom than rig parameters (~100 vs. several thousands), the internal vertices also act as middlemen that are required to compute the internal energy for a given set of rig parameters. They are generally not visible in the resulting animation and of little to no interest to the artist. As such, it may be desirable to establish a formulation in which only the most relevant variables, namely the rig parameters, are exposed as degrees of freedom.

To this end, it may be assumed that the positions of the internal vertices are always defined by the boundary vertices through static equilibrium conditions, i.e., $$q(p) = \operatorname*{argmin}_{\tilde{q}} W(s(p), \tilde{q}). \qquad \text{Equation (12)}$$

While this defines a unique mapping from rig parameters to internal vertices, the corresponding function is implicit: it requires minimizing the elastic energy and thus solving a set of nonlinear equations. Since this is computationally expensive, it may be preferable to approximate this implicit nonlinear map by an explicit linear function.

One option is to use cage-based deformation techniques such as Harmonic coordinates or Green coordinates that are used for deforming a high resolution embedded surface with an enveloping mesh.

Alternatively, the system may include explicit knowledge about how the internal deformation field should evolve as a function of the surface mesh—for every surface configuration, the internal vertex positions can be computed by minimizing a nonlinear elastic energy. This motivates an example-based approach in order to compute an optimal linear approximation to the internal deformation field. First, a description is provided for how to generate a set of example poses and then an explanation is given as to how to compute the linear map.

Generating Example-Poses. It is assumed that there is a small set of (e.g., 5-10) artist-generated poses that are representative of the typical range of motion during animation. In a production environment, such poses are typically created as a means of testing the character during the rigging stage, often referred to as calisthenics. Given these basic poses, an augmented example set is generated by applying a small number of impulse vectors to the surface of the character. Each of the impulse vectors defines initial velocities for the character that can be used to perform a few steps of dynamic simulation by solving equation 10 for the free rig parameters as well as the corresponding equilibrium positions of the internal vertices. The result of this process, which can be referred to as shaking, is a sequence of surface positions and corresponding internal deformation, from which a predefined number is extracted to add to the example set. An example of the process is shown in FIG. 11, in which an impulse vector applied along the horizontal image axis results in a swinging motion for the elephant's trunk 58, providing a sequence of surface deformations and corresponding internal deformations. In this way, a wider range of poses can be generated that also reflect the influence of the simulated rig parameters $p_f$ on the internal vertices.

Example-Based Skinning. The shaking process provides a set of m deformed configurations $x^e = \{s^e, q^e\}$, comprising both surface and internal vertices, that correspond to different poses of the character. For each internal vertex $q_j$, weights $w^i$ for the surface vertices are found that best explain the position of the internal vertex $q_j^e$ in the m different example poses, $$w^j = \operatorname*{argmin}_{\tilde{w}^j} \left\| \begin{bmatrix} s_1^1 & \cdots & s_n^1 \\ \vdots & \ddots & \vdots \\ s_1^m & \cdots & s_n^m \\ 1 & \cdots & 1 \end{bmatrix} * \tilde{w}^j - \begin{bmatrix} q_1^1 \\ \vdots \\ q_n^m \\ 1 \end{bmatrix} \right\| \qquad \text{System (13)}$$

In the above system, each row stands for 3 equations (x, y, and z-components), while the last row asks that weights sum to one, which ensures that the internal vertices transform correctly under rigid transformations on the surface. Solving the above problem for every vertex, a linear map is obtained between surface and internal vertices, $q(s) = Ws$, where $$W = [w^1, w^1, w^1, \ldots, w^{n_q}, w^{n_q}, w^{n_q}]^t$$

is the skinning matrix. This map may be referred to as physics-based volumetric skinning.

Sparse Correspondences. It may be preferable to ask that only a small number of surface vertices influence the behavior of a given internal vertex. Such a sparse set of correspondences may yield an overall better approximation of the true internal deformation if an upper-bound on the fitting error with respect to the training data is enforced. To this end, system (13) may be augmented with a sparse regularizer that penalizes the $L_1$-norm of the weight vector, thus favoring a sparse set of correspondences. In this way, overfitting is eliminated since only those vertices are used that are really required to explain an internal vertex's behavior. At the same time, the problem of having to heuristically determine the right sets of neighbors a priori is avoided. Additionally, the reduced neighbor set also speeds up computations at run-time.

One possible method for computing sparse weights is provided in FIG. 12. Starting from a conservative (or even full) set of correspondences, the initial error $r_0$ of the fit is determined by solving system (13) subject to positivity constraints for the weights using a non-negative least squares solver (solveNNLS, row 2). Newton's method (solveL1, row 8) is then used to iteratively solve the $L_1$-regularized version of system (13) and successively remove the surface vertices with the smallest weights from the correspondence set. The iteration is stopped whenever removing an additional vertex would lead to a residual error r larger than a given threshold value δ (row 5). The final weights $w^j$ are then recomputed by solving system (13) again without the regularizer (row 10).

The result of the sparse algorithm are small sets of surface vertices and corresponding weights that explain the behavior of the internal vertices in a robust and efficient way. Using sparse correspondences improves both the computation efficiency at run time and eliminates overfitting, which in turn leads to a better approximation of the true material behavior.

7.4 Deferred Jacobian Evaluation

Even when keeping the Jacobian constant per time step, its evaluation still constitutes a major part of the total computation time. Yet, due to the inherent temporal coherence in animations, the Jacobian often does not change significantly from one time step to the next. As such, it may be preferable for the Jacobian to be recomputed only when necessary. While it is, to some extent, acceptable to trade accuracy for performance, stability should not be compromised. Therefore, it is desirable to have a robust indicator for evaluating the error incurred by keeping the same Jacobian over multiple time steps.

In order to quantify the error of the current approximation, a comparison is performed on the end-of-time-step surface vertex positions $\tilde{s}=s(p_n)+J\Delta p$ predicted by the linear approximate to the actual positions $s(p_n)+\Delta p$. A natural metric for this difference is the kinetic energy due to the difference in position over the time step h, $$\Delta E_{kin} = \frac{1}{2h}(\tilde{s}-s(p_n+\Delta p))^t M_s(\tilde{s}-s(p_n+\Delta p)). \quad \text{Equation (14)}$$

Computing this indicator requires only one rig evaluation, but it provides valuable information about the linearity of the rig around the current set of parameters and in the direction of the character's motion. The existing Jacobian may be reused to step the rig parameters forward in time. The indicator is then evaluated and, if it signals too high a degree of nonlinearity, the method is rolled-back to the beginning of the step, the Jacobian $J(p_n)$ is computed and the simulation is run again. While this approach is always robust and efficient in many cases, animations with rapid motion and extreme deformations can lead to an excessive number of roll-backs, effectively undoing the advantage of deferred Jacobian evaluation. In order to decrease the number of such roll-backs, an additional indicator may be used that estimates the end-of-time step parameters $\tilde{p}$ using an extrapolation of past states as $$\tilde{p} = p_n + \frac{1}{h}(p_n - p_{n-1}).$$

This indicator results in a significantly reduced number of rollbacks while keeping the number of Jacobian reevaluations low.

7.5 Implementation

Using the disclosed physics-based skinning method, the Equation (10) now only depends on the free rig parameters, i.e., H=H(p). Time-stepping is performed by minimizing H(p) using Newton's method, which requires the gradient and Hessian of H, which are provided here for convenience. It is emphasized once again that, while each iteration requires the reevaluation of the elastic energy gradient and Hessian, the rig Jacobian stays constant. The gradient of H can be obtained as $$\frac{\partial}{\partial p}H(p) = J^t\left(M_s a_s + \frac{\partial W}{\partial s} + W^t\left(M_q a_q + \frac{\partial W}{\partial q}\right)\right)$$

and the Hessian follows as $$\frac{\partial^2 H(p)}{\partial p^2} = J^t\left(\frac{1}{h^2}M_s + \frac{\partial^2 W}{\partial s^2} + W^t\left(\frac{1}{h^2}M_q + \frac{\partial^2 W}{\partial q^2}\right)W\right)J + J^t\left(W^t\frac{\partial^2 W}{\partial q \partial s} + \frac{\partial^2 W}{\partial s \partial q}W\right)J.$$

FIG. 13 provides a comparison of the general rig space physics system against the efficient rig space physics system, using the elephant walk cycle animation of FIG. 5. The trunk and the belly of the elephant were simulated separately, which are controlled through 13 (trunk) and respectively 36 (belly) rig parameters. FIG. 13 compares the simulation time as well as the difference in geometric deformation using several different options. The measure $t_{frame}$ is the computation time of each frame in seconds, and sp is the speedup. It can be seen that the linearized formulation (row 2) is faster than the reference rig space physics method (row 1). By comparing rows 2 and 3 (both using static solves, i.e., IV1) with rows 4 and 5 (both using skinning, i.e., IV2), respectively, it can be seen that the physics-based volumetric skinning and its associated dimension reduction achieves another drastic speedup. Finally, it is also demonstrated that the deferred Jacobian evaluation scheme (rows 3 and 5) offers significant gains in speed for the belly of the elephant, whereas there is no speedup for the trunk. The reason for this is that the rig is mostly linear in the region of the belly and the method can thus leverage the full potential of deferred Jacobian evaluation. For the trunk, however, the rig is based on a nonlinear wire deformer and its Jacobian changes significantly in virtually every step of the animation.

Despite these significant accelerations, the quality of the animation remains the same: visually, the differences between the original rig space physics method and the efficient rig space physics method are imperceptible, as the average/maximum different in vertex position for the belly is below 0.08%/1.4% of the character's height for all frames.

FIG. 14 provides another example using the efficient rig space physics method using an animation of a sumo wrestler, Sumone. In addition to the usual pose controls, this character also has a total of 174 rig parameters for secondary motion, all of which were simulated using the efficient rig space physics method. An exemplary frame of this animation is shown in FIG. 14. Simulating this large number of parameters is generally impractical using the original Rig Space Physics method, whereas the efficient rig space physics method takes less than one second per animation frame. The timings for this animation are also listed in FIG. 13 (column "Sumone"). Similar to the elephant walk example, the physics-based skinning offers a significant speedup, as does the deferred Jacobian evaluation.

Figure 15:
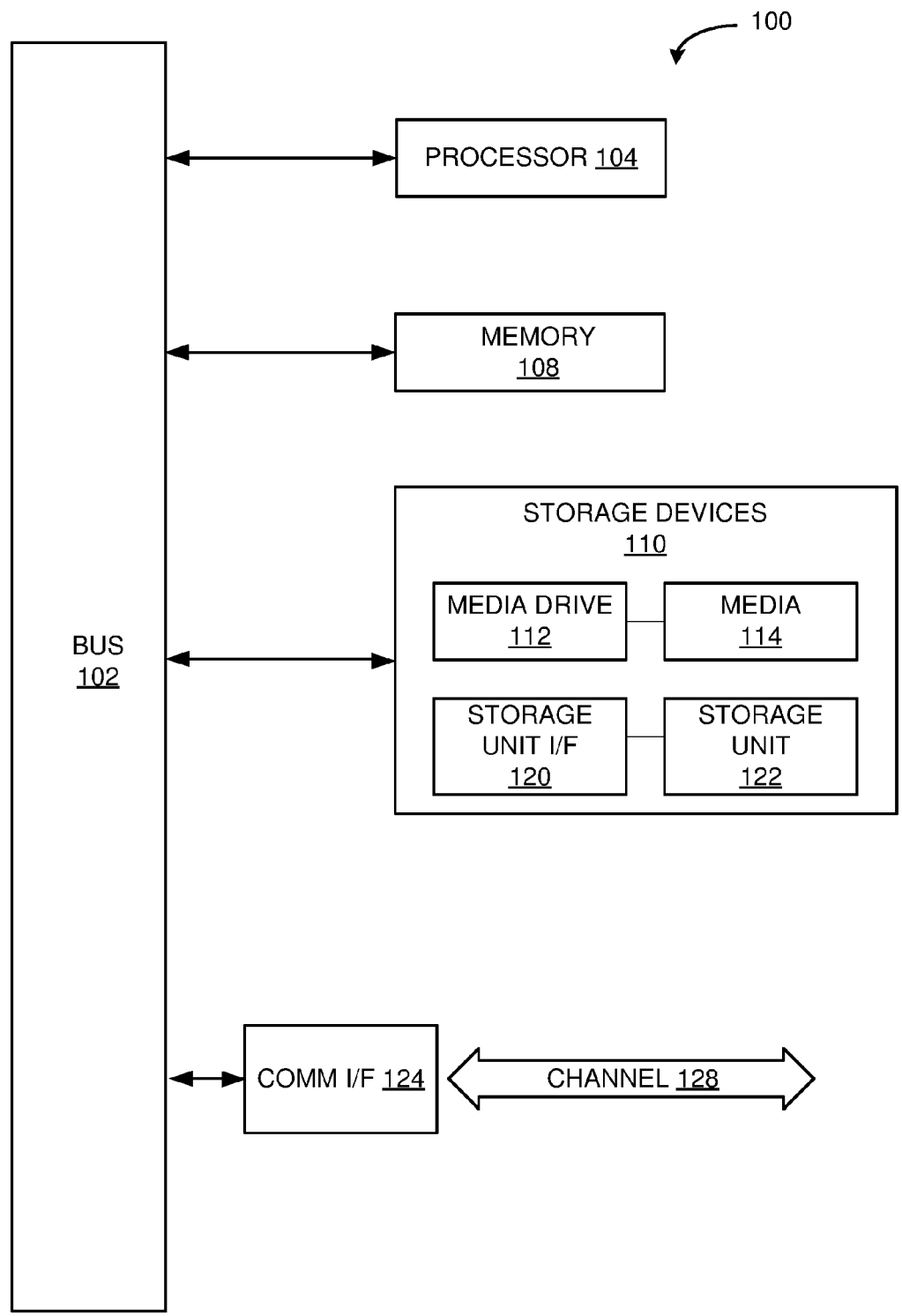
FIG. 15 illustrates an example computing module that may be used in implementing various features of embodiments of the methods described herein.

The disclosed methods and techniques may be implemented in whole or in part using software. In one embodiment, these software elements can be implemented to operate with a computing or processing module capable of carrying out the functionality described with respect thereto. One such example computing module is shown in FIG. 15. Various embodiments are described in terms of this example-computing module 100. After reading this description, it will become apparent to a person skilled in the relevant art how to implement the disclosure using other computing modules or architectures.

Referring now to FIG. 15, computing module 100 may represent, for example, computing or processing capabilities found within desktop, laptop and notebook computers; hand-held computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 100 might include, for example, one or more processors, controllers, control modules, or other processing devices, such as a processor 104. Processor 104 might be implemented using a general-purpose or special-purpose processing engine such as, for example, a microprocessor, controller, or other control logic. In the illustrated example, processor 104 is connected to a bus 102, although any communication medium can be used to facilitate interaction with other components of computing module 100 or to communicate externally.

Computing module 100 might also include one or more memory modules, simply referred to herein as main memory 108. For example, random access memory (RAM) or other dynamic memory might be used for storing information and instructions to be executed by processor 104. Main memory 108 might also be used for storing temporary variables or other intermediate information during execution of instructions to be executed by processor 104. Computing module 100 might likewise include a read only memory ("ROM") or other static storage device coupled to bus 102 for storing static information and instructions for processor 104.

The computing module 100 might also include one or more various forms of information storage mechanism 110, which might include, for example, a media drive 112 and a storage unit interface 120. The media drive 112 might include a drive or other mechanism to support fixed or removable storage media 114. For example, a hard disk drive, a floppy disk drive, a magnetic tape drive, an optical disk drive, a CD or DVD drive (R or RW), or other removable or fixed media drive might be provided. Accordingly, storage media 114 might include, for example, a hard disk, a floppy disk, magnetic tape, cartridge, optical disk, a CD or DVD, or other fixed or removable medium that is read by, written to or accessed by media drive 112. As these examples illustrate, the storage media 114 can include a computer readable storage medium having stored therein computer software or data.

In alternative embodiments, information storage mechanism 110 might include other similar instrumentalities for allowing computer programs or other instructions or data to be loaded into computing module 100. Such instrumentalities might include, for example, a fixed or removable storage unit 122 and an interface 120. Examples of such storage units 122 and interfaces 120 can include a program cartridge and cartridge interface, a removable memory (for example, a flash memory or other removable memory module) and memory slot, a PCMCIA slot and card, and other fixed or removable storage units 122 and interfaces 120 that allow software and data to be transferred from the storage unit 122 to computing module 100.

Computing module 100 might also include a communications interface 124. Communications interface 124 might be used to allow software and data to be transferred between computing module 100 and external devices. Examples of communications interface 124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 124 might typically be carried on signals, which can be electronic, electromagnetic (which includes optical) or other signals capable of being exchanged by a given communications interface 124. These signals might be provided to communications interface 124 via a channel 128. This channel 128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium" and "computer usable medium" are used to generally refer to media such as, for example, main memory 108, storage unit interface 120, storage media 114, and channel 128. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 100 to perform features or functions of the present disclosure as discussed herein.

While various embodiments of the application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The framework presented allows animators to exploit the benefits of dynamic simulations without any change to the typical workflow they follow when creating animations. The disclosed method can treat any animation rig as a black-box, non-linear map between a high-level set of rig parameters and the vertices of the mesh being animated. The output of the method can be a set of animation curves that are virtually identical to the ones created by animators through keyframing. The effectiveness of the method was demonstrated using Maya rigs. In particular, two of the examples shown consist of complex rigs that allow for a large space of deformations. To increase the usefulness of the method, a method was disclosed that allows animators to non-homogeneously change the stiffness of each rig parameter.

The animation curves produced by the disclosed system can readily be edited by artists. Scaling the animation curves in their entirety emphasizes or reduces the physical effects that are introduced. Incorporating balance control strategies at the level of the dynamical system being simulated could lead to rigged characters that are capable of autonomously reacting to collisions with other virtual objects, without requiring additional artist input.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A method, comprising:
receiving an animation rig with a plurality of rig parameters, the rig parameters defining a deformation space for an attached surface mesh, the attached surface mesh comprising a plurality of nodes, the animation rig further comprising a volumetric mesh comprising a plurality of internal nodes and a correspondence set defining the connectivity among the plurality of internal nodes and a plurality of surface vertices of the attached surface mesh;
receiving material stiffness data on a subset of the rig parameters, the material stiffness data defining a stiffness scale value for each of the subset of the rig parameters, wherein the stiffness scale value is relative to a stiffness of a homogeneous material chosen for a finite element method model derived from the attached surface mesh;
using the volumetric mesh to compute internal deformations and corresponding elastic energies;
using the rig and the material stiffness data to influence a physics-based simulation of the effects of one or more of gravity, inertia, and penalty-collisions, wherein the physics-based simulation of the effects of one or more of gravity, inertia, and penalty-collisions is constrained by the deformation space of the rig; and
generating a plurality of keyframes on some or all of the parameters as a result of the physics-based simulation of the effects of one or more of gravity, inertia, and penalty-collisions;
wherein the physics-based simulation comprises eliminating one or more of the plurality of surface vertices from the correspondence set such that a plurality of degrees of freedom required to compute the physics-based simulation are reduced to the subset of the rig parameters.

2. The method of claim 1, further comprising analyzing the simulation to create a set of high-level rig parameters, each high-level rig parameter being a combination of two or more of the rig parameters.

3. The method of claim 2, further comprising using one or more of the high-level rig parameters to influence a second physics-based simulation; and
generating keyframes on the animation rig as a result of the second simulation.

4. The method of claim 1, further comprising using one or more of the rig parameters to perform inverse kinematics calculations on the animation rig.

5. The method of claim 4, wherein the rig parameters can be used to calculate an elastic energy, and
further wherein, using one or more of the rig parameters to perform inverse kinematics calculations on the animation rig comprises
receiving position values for a subset of the surface mesh nodes, and
calculating the remaining surface mesh node position values such that the elastic energy in the deformation space is substantially minimized.

6. The method of claim 1, wherein the physics-based simulation comprises linearizing the animation rig at one or more frames of the animation.

7. The method of claim 1, wherein eliminating one or more of the plurality of internal nodes creates a residual error, and elimination of the one or more of the plurality of nodes is performed such that the residual error does not surpass a predetermined threshold.

8. The method of claim 1, wherein the physics-based simulation comprises
calculating a Jacobian, and
calculating a Jacobian error.

9. The method of claim 8, wherein a calculated Jacobian error that is above a predetermined Jacobian error threshold causes the Jacobian to be recomputed, and a calculated Jacobian error that is below the predetermined Jacobian error threshold causes the Jacobian to remain constant.

10. A non-transitory computer readable medium comprising an instruction set configured to cause a computing device to perform:
receiving an animation rig with a plurality of rig parameters, the rig parameters defining a deformation space for an attached surface mesh, the attached surface mesh comprising a plurality of nodes, the animation rig further comprising a volumetric mesh comprising a plurality of internal nodes and a correspondence set defining the connectivity among the plurality of internal nodes and a plurality of surface vertices of the attached surface mesh;
receiving material stiffness data on a subset of the rig parameters, the material stiffness data defining a stiffness scale value for each of the subset of the rig parameters, wherein the stiffness scale value is relative to a stiffness of a homogeneous material chosen for a finite element method model derived from the attached surface mesh;
using the volumetric mesh to compute internal deformations and corresponding elastic energies;
using the rig and the material stiffness data to influence a physics-based simulation of the effects of one or more of gravity, inertia, and penalty-collisions, wherein the physics-based simulation of the effects of one or more of gravity, inertia, and penalty-collisions is constrained by the deformation space of the rig; and
generating a plurality of keyframes on some or all of the rig parameters as a result of the physics-based simulation of the effects of one or more of gravity, inertia, and penalty-collisions;
wherein the physics-based simulation comprises eliminating one or more of the plurality of surface vertices from the correspondence set such that a plurality of degrees of freedom required to compute the physics-based simulation are reduced to the subset of the rig parameters.

11. The non-transitory computer readable medium of claim 10, wherein the instruction set is further configured to cause a computing device to perform analyzing the simulation to create a set of high-level rig parameters, each high-level rig parameter being a combination of two or more of the rig parameters.

12. The non-transitory computer readable medium of claim 11, wherein the instruction set is further configured to cause a computing device to perform:
using one or more of the high-level rig parameters to influence a second physics-based simulation; and
generating keyframes on the animation rig as a result of the second simulation.

13. The non-transitory computer readable medium of claim 10, wherein the instruction set is further configured to cause a computing device to perform using one or more of the rig parameters to perform inverse kinematics calculations on the animation rig.

14. The non-transitory computer readable medium of claim 13, wherein the rig parameters can be used to calculate an elastic energy, and
further wherein, using one or more of the rig parameters to perform inverse kinematics calculations on the animation rig comprises
receiving position values for a subset of the surface mesh nodes, and
calculating the remaining surface mesh node position values such that the elastic energy in the deformation space is substantially minimized.

15. The non-transitory computer readable medium of claim 10, wherein the physics-based simulation comprises linearizing the animation rig at one or more frames of the animation.

16. The non-transitory computer readable medium of claim 10, wherein eliminating one or more of the plurality of internal nodes creates a residual error, and elimination of the one or more of the plurality of internal nodes is performed such that the residual error does not surpass a pre-determined threshold.

17. The non-transitory computer readable medium of claim 10, wherein the physics-based simulation comprises calculating a Jacobian, and
calculating a Jacobian error.

18. The non-transitory computer readable medium of claim 17, wherein a calculated Jacobian error that is above a predetermined Jacobian error threshold causes the Jacobian to be recomputed, and a calculated Jacobian error that is below the predetermined Jacobian error threshold causes the Jacobian to remain constant.

\* \* \* \* \*